US008676241B2

(12) United States Patent
Hashimoto et al.

(10) Patent No.: US 8,676,241 B2
(45) Date of Patent: Mar. 18, 2014

(54) DISTRIBUTED ANTENNA SYSTEM, COMMUNICATION CONTROL METHOD AND BASE STATION APPARATUS

(75) Inventors: Koichi Hashimoto, Miharu (JP); Tsuyoshi Tamaki, Machida (JP)

(73) Assignee: Hitachi, Ltd., Tokyo (JP)

( * ) Notice: Subject to any disclaimer, the term of this patent is extended or adjusted under 35 U.S.C. 154(b) by 219 days.

(21) Appl. No.: 13/355,121

(22) Filed: Jan. 20, 2012

(65) Prior Publication Data
US 2012/0214528 A1 Aug. 23, 2012

(30) Foreign Application Priority Data
Feb. 22, 2011 (JP) ................................ 2011-035578

(51) Int. Cl.
*H04B 7/00* (2006.01)

(52) U.S. Cl.
USPC .......................... 455/509; 455/501; 455/67.16

(58) Field of Classification Search
USPC ........ 455/67.11, 517, 509, 501, 67.16, 562.1; 370/315, 328–330
See application file for complete search history.

(56) References Cited

U.S. PATENT DOCUMENTS

| 2009/0232073 | A1 | 9/2009 | Yan et al. | |
|---|---|---|---|---|
| 2010/0069122 | A1 | 3/2010 | Ito | |
| 2012/0106501 | A1* | 5/2012 | Kishiyama et al. | 370/330 |
| 2012/0149411 | A1* | 6/2012 | Miyoshi et al. | 455/501 |
| 2012/0208581 | A1* | 8/2012 | Ishida et al. | 455/509 |
| 2012/0322477 | A1* | 12/2012 | Kang et al. | 455/501 |
| 2012/0322492 | A1* | 12/2012 | Koo et al. | 455/517 |
| 2013/0215845 | A1* | 8/2013 | Lee et al. | 370/329 |
| 2013/0242853 | A1* | 9/2013 | Seo et al. | 370/315 |
| 2013/0273854 | A1* | 10/2013 | Zhang et al. | 455/67.11 |

FOREIGN PATENT DOCUMENTS

| JP | 2009-219121 | 9/2009 |
|---|---|---|
| JP | 2010-068496 | 3/2010 |

* cited by examiner

*Primary Examiner* — Sujatha Sharma
(74) *Attorney, Agent, or Firm* — Foley & Lardner LLP

(57) ABSTRACT

The selection range of antenna candidates effective for MIMO communication is widened in a base station to increase the throughput of MIMO communication. A terminal sends a sounding signal at given time intervals with the maximum transmission power or with an antenna selection transmission power threshold or larger. With this transmission, since the number of antenna candidates that receive the signal is increased at a base station in the distributed antenna system, the radio propagation channel state between the terminal and the base station apparatus is checked to select the combination of antennas having good orthogonality. Before the terminal sends the sounding signal, the terminal reserves beforehand the transmission timing of the sounding signal or performs carrier sensing to determine whether a surrounding terminal is sending a signal to avoid the collision/interference of packets of sounding signals between terminals.

17 Claims, 16 Drawing Sheets

STRUCTURE OF A DISTRIBUTED ANTENNA SYSTEM

【 1st EMBODIMENT 】
STRUCTURE OF REPORT SIGNAL, RESERVATION SIGNAL,
AND ACKNOWLEDGE SIGNAL

1. EXAMPLE STRUCTURE OF REPORT SIGNAL

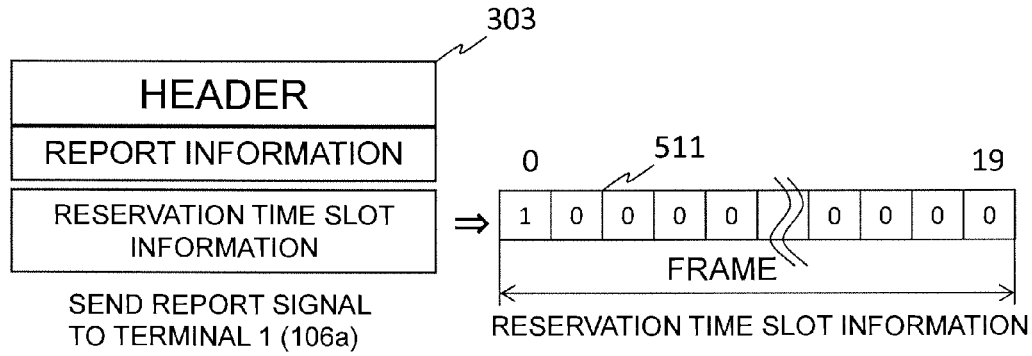

SEND REPORT SIGNAL
TO TERMINAL 1 (106a)

RESERVATION TIME SLOT INFORMATION

2. EXAMPLE STRUCTURE OF RESERVATION SIGNAL

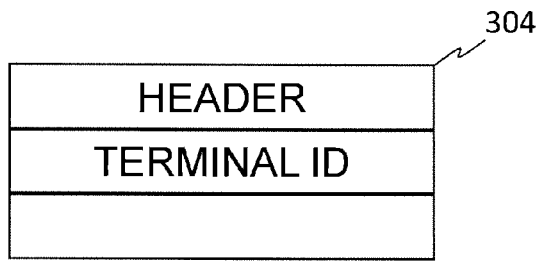

SEND RESERVATION SIGNAL TO BASE STATION APPARATUS (102)

3. EXAMPLE STRUCTURE OF ACKNOWLEDGE SIGNAL

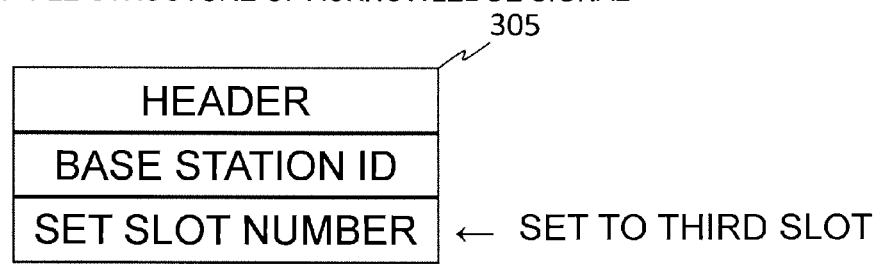

← SET TO THIRD SLOT

REPORT TRANSMISSION POSSIBLE TIME SLOT INFORMATION
TO TERMINAL 1 (106a)

FIG.4

[ 4th EMBODIMENT ]
STRUCTURE OF REPORT SIGNAL, RESERVATION SIGNAL AND ACKNOWLEDGE SIGNAL

1. EXAMPLE STRUCTURE OF REPORT SIGNAL

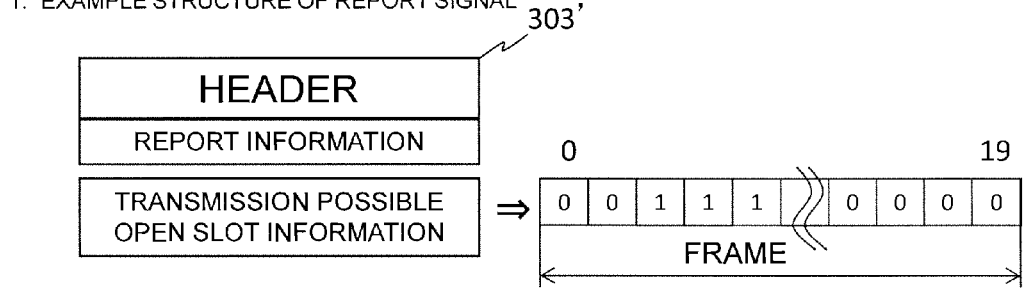

SEND REPORT SIGNAL TO TERMINAL 1 (106a)

TRANSMISSION POSSIBLE OPEN SLOT INFORMATION (SPECIFY THIRD, FOURTH, AND FIFTH SLOTS)

2. EXAMPLE STRUCTURE OF RESERVATION SIGNAL

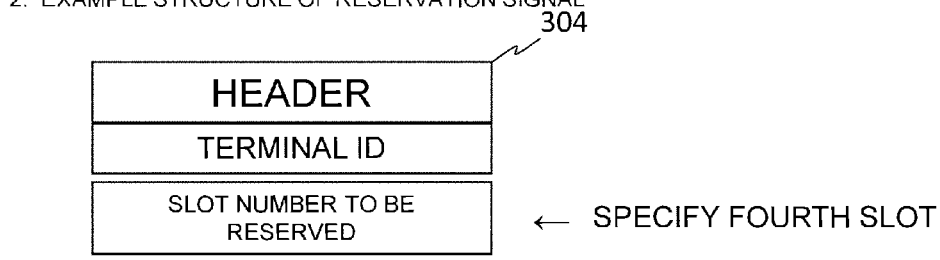

SEND RESERVATION SIGNAL TO BASE STATION APPARATUS (102)

3. EXAMPLE STRUCTURE OF ACKNOWLEDGE SIGNAL

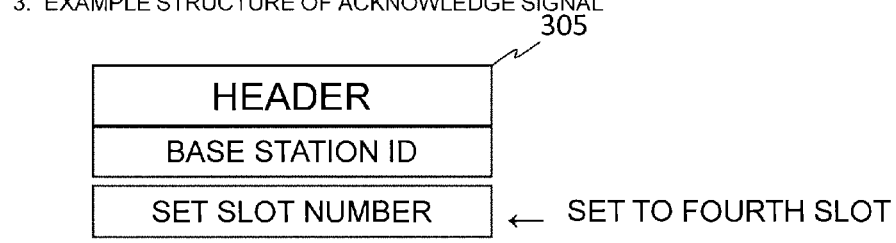

REPORT TRANSMISSION POSSIBLE TIME SLOT INFORMATION TO TERMINAL 1 (106a)

FIG.16

DISTRIBUTED ANTENNA SYSTEM, COMMUNICATION CONTROL METHOD AND BASE STATION APPARATUS

CLAIM OF PRIORITY

The present application claims priority from Japanese patent application JP 2011-035578 filed on Feb. 22, 2011, the content of which is hereby incorporated by reference into this application.

BACKGROUND OF THE INVENTION

1. Field of the Invention

The present invention relates to distributed antenna systems, communication control methods, and base station apparatuses.

2. Description of the Related Art

Distributed antenna systems (DASs) in which antennas are distributed and disposed in a building have been known as related art in the technical field of the present invention. In the conventional distributed antenna systems, a method has been known in which a leakage coaxial cable is laid from a base station apparatus and electromagnetic waves are emitted around the laid cable. A method has also been known in which an analog transfer signal input to or output from a base station apparatus is distributed to a plurality of antennas with coaxial cables through an apparatus that branches or couples the signal. In the conventional distributed antenna systems, since a signal input to or output from a base station apparatus is distributed to a plurality of antennas, an identical signal is input to or output from all the antennas.

In recent years, in high-speed radio communication methods such as long term evolution (LTE) and worldwide interoperability for microwave access (WiMAX), the multiple input multiple output (MIMO) technology, in which data is sent from a plurality of antennas and received by a plurality of antennas, has been employed in terms of the improvement of frequency use efficiency. In this MIMO technology, since different signals need to be sent from and received by a plurality of antennas, for example, it is demanded also in distributed antenna systems that different signals be sent from and received by a plurality of antennas.

Applying MIMO to the above described DASs can increase the system capacity.

Related art used when the MIMO technology is applied to a distributed antenna system is described in Japanese Unexamined Patent Application Publication No. 2010-068496 (patent document 1). This document discloses that a power measurement section of a terminal measures the receiving power of a pilot signal sent from each antenna of a distributed antenna system for a long period; the terminal selects a predetermined number of antennas having high receiving power as communication antenna candidates, and reports the communication antenna candidates and the corresponding receiving power to a radio base station apparatus; a channel estimate section of the terminal receives communication possible antennas and antenna index information assigned thereto from the radio base station apparatus, and performs channel estimation for the communication possible antennas; and, since it is necessary to determine a precoding matrix to be used in calculation applied to a transmission signal from the base station apparatus, in order to perform MIMO communication, precoding matrix indexes (PMIs) related to the communication possible antennas are obtained according to the channel estimation in the terminal, and the PMIs are reported to the radio base station apparatus in communication by using the antenna index information, so that the phase rotation, power ratio, and other factors of each antenna used to perform data communication are controlled.

SUMMARY OF THE INVENTION

Japanese Unexamined Patent Application Publication No. 2009-219121 (patent document 2) discloses that a pilot signal sent from each user located in a predetermined zone is detected, the receiving power of the pilot signal sent from each user is obtained, user scheduling is performed based on the receiving power to obtain one user group having at least one user, and an identical physical resource is assigned to each user in the user group.

Japanese Unexamined Patent Application Publication No. 2010-068496 (patent document 1) describes that the power measurement section of the terminal measures the receiving power of a pilot signal sent from each antenna of the distributed antenna system for a long period; and the terminal selects the predetermined number of antennas having high receiving power as communication antenna candidates, and reports the communication antenna candidates and the corresponding receiving power to the radio base station apparatus. In the antenna selection method, the pilot signal sent from each antenna in the distributed antenna system is used to select antennas having high receiving power. Therefore, it is necessary to send a pilot signal from all the antennas in the distributed antenna system. When the distributed antenna system has an increased number of antennas, pilot signal transmission overhead becomes large.

To reduce such overhead, instead of reporting, as feedback, the results of measurement at the terminal of the pilot signals sent from the antennas in the distributed antenna system, it can be considered that the receiving power of a pilot signal sent from the terminal is measured at the antennas in the distributed antenna system. Japanese Unexamined Patent Application Publication No. 2009-219121 (patent document 2) discloses that a physical resource is assigned to each user by using the receiving power of a pilot signal (hereafter called a sounding signal) sent from each user.

In general, a user sends a sounding signal with the transmission power lowest possible to reach an antenna of a base station under transmission power control in order to reduce interference with the surroundings. Therefore, the number of antennas that can receive the sounding signal sent from the terminal is limited in the distributed antenna system. In some cases, just one antenna having the best radio propagation or two to a small number of antennas can be antenna candidates. Among such a limited number of antennas, an antenna located in a direct access range from the terminal is selected in the distributed antenna system. When MIMO communication is performed, orthogonal independent paths serving as a radio propagation channel may be unobtainable, reducing the throughput.

Accordingly, it is an object of the present invention to provide a distributed antenna system in which a base station selects an antenna according to a reference signal (a sounding signal, for example) sent from a terminal to make it unnecessary for all antennas in the distributed antenna system to send a reference signal such as a pilot signal and to reduce the overhead of the reference signal such as a pilot signal. Another object of the present invention is to widen the selection range of antenna candidates that are effective in MIMO communication at a base station in a distributed antenna system and to improve the throughput of MIMO communication by making a terminal send a reference signal (a sounding signal, for example) with the maximum transmission power or with a predetermined transmission power threshold (hereafter called an antenna selection transmission power threshold) which is larger than data communication power, or larger at given time intervals.

In one aspect of the present invention, in a distributed antenna system, a terminal sends a reference signal (hereafter, a sounding signal will be taken as an example) with the maximum transmission power or with an antenna selection transmission power threshold or larger at given time intervals. With this transmission, since the number of antenna candidates that receive the signal at the base station in the distributed antenna system is increased, it becomes possible to select antennas having good orthogonality in a radio propagation channel between the terminal and the base station. Since the terminal sends the sounding signal with the maximum transmission power or with the antenna selection transmission power threshold or larger, interference with the surroundings increases. When the transmission timing of the sounding signal is reserved, the interference between sounding signals sent from terminals is avoided.

In another aspect of the present invention, since carrier sensing is performed before a sounding signal is sent, in order to check whether a signal is being sent from a surrounding terminal, the collision/interference of sounding signals can be avoided by carrier sense multiple access (CSMA). When a sounding signal used to select an antenna is sent at rather long intervals, antenna re-selection becomes possible.

In still another aspect of the present invention, a sounding signal used to select an antenna and a sounding signal used to perform MIMO communication can be distinguished and operated. Since a sounding signal for MIMO communication needs to be used to collect radio propagation channel information between selected antennas, the sounding signal can be subjected to transmission power control and sent at short intervals. In an antenna selection method, the number of transmission antennas to be used in MIMO needs to be selected at the base station apparatus in descending order of receiving power of a sounding signal sent from a terminal with the maximum transmission power or with an antenna selection transmission power threshold or larger. Alternatively, a plurality of antennas having a receiving power threshold or larger of a sounding signal sent from a terminal may be extracted, and radio propagation channel acknowledge matrixes for the number of antennas required for MIMO communication may be generated from a combination of the extracted antenna candidates. The eigenvalues of the radio propagation channel acknowledge matrixes corresponding to the combinations of antennas can be calculated and the combination of antennas having a large sum of eigenvalues can be selected. Under the condition that the eigenvalues are equal to or larger than a threshold, the differences between the eigenvalues can be checked to select the combination of antennas having the smallest difference between the eigenvalues.

The present invention provides, for example, a distributed antenna system that includes a base station apparatus having a plurality of antennas; a terminal having a plurality of antennas; and a plurality of distribution apparatuses accommodating one or a plurality of antennas, the plurality of distribution apparatuses being distributed spatially and disposed.

The terminal includes means for periodically sending an antenna selection sounding signal; means for sending a data communication sounding signal; means for controlling transmission signal power; and means for avoiding the collision of the above described sounding signals and a sounding signal sent from another terminal.

The base station apparatus includes means for avoiding the collision of sounding signals sent from a plurality of antennas, and means for selecting a plurality of effective antennas according to a sounding signal sent from the terminal.

The terminal sends the antenna selection sounding signal at given intervals with the maximum transmission power or with a antenna selection transmission power threshold or larger while avoiding the collision with a sounding signal sent from another terminal; and the base station apparatus selects a plurality of antennas according to the received antenna selection sounding signal, and performs data communication with transmission power required between the terminal and the plurality of antennas selected.

It is possible that the means for avoiding the collision of sounding signals sent from a plurality of antennas, provided for the base station apparatus, and the means for avoiding the collision of a sounding signal sent from the terminal and a sounding signal sent from another terminal, provided for the terminal, operate in the following way.

The base station apparatus periodically sends a reservation time slot for sending the antenna selection sounding signal as report information. The means for avoiding the collision of sounding signals in the terminal sends a reservation signal that includes, as information element, the number of the transmission timing slot of the antenna selection sounding signal, in the reservation time slot for sending the antenna selection sounding signal, described as the report information periodically sent from the base station apparatus. When the transmission timing slot of the antenna selection sounding signal, described in the reservation signal, is not assigned to another terminal, the base station apparatus sends an acknowledge signal indicating that the reservation is successful, to the terminal; and when the transmission timing slot of the antenna selection sounding signal is assigned to another terminal, the base station apparatus sends an acknowledge signal indicating that the reservation is not successful, to the terminal.

Only when the terminal receives the acknowledge signal indicating that the reservation is successful, the terminal sends the antenna selection sounding signal in the reserved transmission timing slot with the maximum transmission power or with the antenna selection transmission power threshold or larger. When the reservation is not successful, a reservation can be made again in the next frame.

According to the first solving means of the present invention, there is provided a distributed antenna system comprising:

a base station apparatus having a plurality of antennas;

a terminal having a plurality of antennas; and a plurality of distribution apparatuses accommodating one or a plurality of antennas, the plurality of distribution apparatuses being distributed spatially and disposed;

the base station apparatus and the terminal adjusting a transmission time slot or a transmission timing for sending an antenna selection reference signal;

the terminal sending the antenna selection reference signal in the adjusted time slot or the adjusted transmission timing with the maximum transmission power or with a predetermined antenna selection transmission power threshold which is larger than data communication power, or larger;

the base station apparatus receiving the antenna selection reference signal with the plurality of antennas of each distribution apparatus and performing antenna selection processing for selecting one or a plurality of antennas to be used, according to the receiving strength or receiving state of the antenna selection reference signal;

the base station apparatus obtaining channel information for radio propagation between the terminal and the one or the plurality of antennas selected, according to the antenna selection reference signal, and generating and sending a data signal for data communication by using the channel information;

the terminal controlling transmission power such that a signal reaches the one or the plurality of antennas selected, with a sufficient receiving power, and reporting a data communication reference signal; and the base station apparatus updating the channel information for the radio propagation according to the data communication reference signal received from the terminal and sending a data signal by using the updated channel information.

According to the second solving means of the present invention, there is provided a communication control method in a distributed antenna system comprising:

a base station apparatus having a plurality of antennas;
a terminal having a plurality of antennas; and
a plurality of distribution apparatuses accommodating one or a plurality of antennas, the plurality of distribution apparatuses being distributed spatially and disposed;

the communication control method including steps of:

the base station apparatus and the terminal adjusting a transmission time slot or a transmission timing for sending an antenna selection reference signal;

the terminal sending the antenna selection reference signal in the adjusted time slot or the adjusted transmission timing with the maximum transmission power or with a predetermined antenna selection transmission power threshold which is larger than data communication power, or larger;

the base station apparatus receiving the antenna selection reference signal with the plurality of antennas of each distribution apparatus and performing antenna selection processing for selecting one or a plurality of antennas to be used, according to the receiving strength or receiving state of the antenna selection reference signal;

the base station apparatus obtaining channel information for radio propagation between the terminal and the one or the plurality of antennas selected, according to the antenna selection reference signal, and generating and sending a data signal for data communication by using the channel information;

the terminal controlling transmission power such that a signal reaches the one or the plurality of antennas selected, with a sufficient receiving power, and reporting a data communication reference signal; and the base station apparatus updating the channel information for the radio propagation according to the data communication reference signal received from the terminal and sending a data signal by using the updated channel information.

According to the third solving means of the present invention, there is provided a base station apparatus in a distributed antenna system comprising:

the base station apparatus having a plurality of antennas;
a terminal having a plurality of antennas; and
a plurality of distribution apparatuses accommodating one or a plurality of antennas, the plurality of distribution apparatuses being distributed spatially and disposed;

the base station apparatus, with the terminal, adjusting a transmission time slot or a transmission timing for sending an antenna selection reference signal;

the base station apparatus, from the terminal, receiving the antenna selection reference signal in the adjusted time slot or the adjusted transmission timing with the maximum transmission power or with a predetermined antenna selection transmission power threshold which is larger than data communication power, or larger;

the base station apparatus receiving the antenna selection reference signal with the plurality of antennas of each distribution apparatus and performing antenna selection processing for selecting one or a plurality of antennas to be used, according to the receiving strength or receiving state of the antenna selection reference signal;

the base station apparatus obtaining channel information for radio propagation between the terminal and the one or the plurality of antennas selected, according to the antenna selection reference signal, and generating and sending a data signal for data communication by using the channel information;

the base station apparatus, from the terminal, receiving a data communication reference signal, transmission power of which is controlled such that a signal reaches the one or the plurality of antennas selected, with a sufficient receiving power, and; and the base station apparatus updating the channel information for the radio propagation according to the data communication reference signal received from the terminal and sending a data signal by using the updated channel information.

By the present invention, it is possible to provide a distributed antenna system in which a base station selects an antenna according to a reference signal (a sounding signal, for example) sent from a terminal to make it unnecessary for all antennas in the distributed antenna system to send a reference signal such as a pilot signal and to reduce the overhead of the reference signal such as a pilot signal. Also, by the present invention, it is possible to widen the selection range of antenna candidates that are effective in MIMO communication at a base station in a distributed antenna system by making a terminal send a reference signal (a sounding signal, for example) with the maximum transmission power or with an antenna selection transmission power threshold or larger at given time intervals. Therefore, it is expected that MIMO communication throughput will increase not only by just selecting antennas having a high receiving power but also by selecting the antennas with the orthogonality of radio propagation paths being taken into consideration.

BRIEF DESCRIPTION OF THE DRAWINGS

FIG. 4 shows a report signal, a reservation signal, and an acknowledge signal in a first embodiment.

FIG. 16 shows a report signal, a reservation signal, and an acknowledge signal in the fourth embodiment.

DESCRIPTION OF THE PREFERRED EMBODIMENTS

Figure 1:
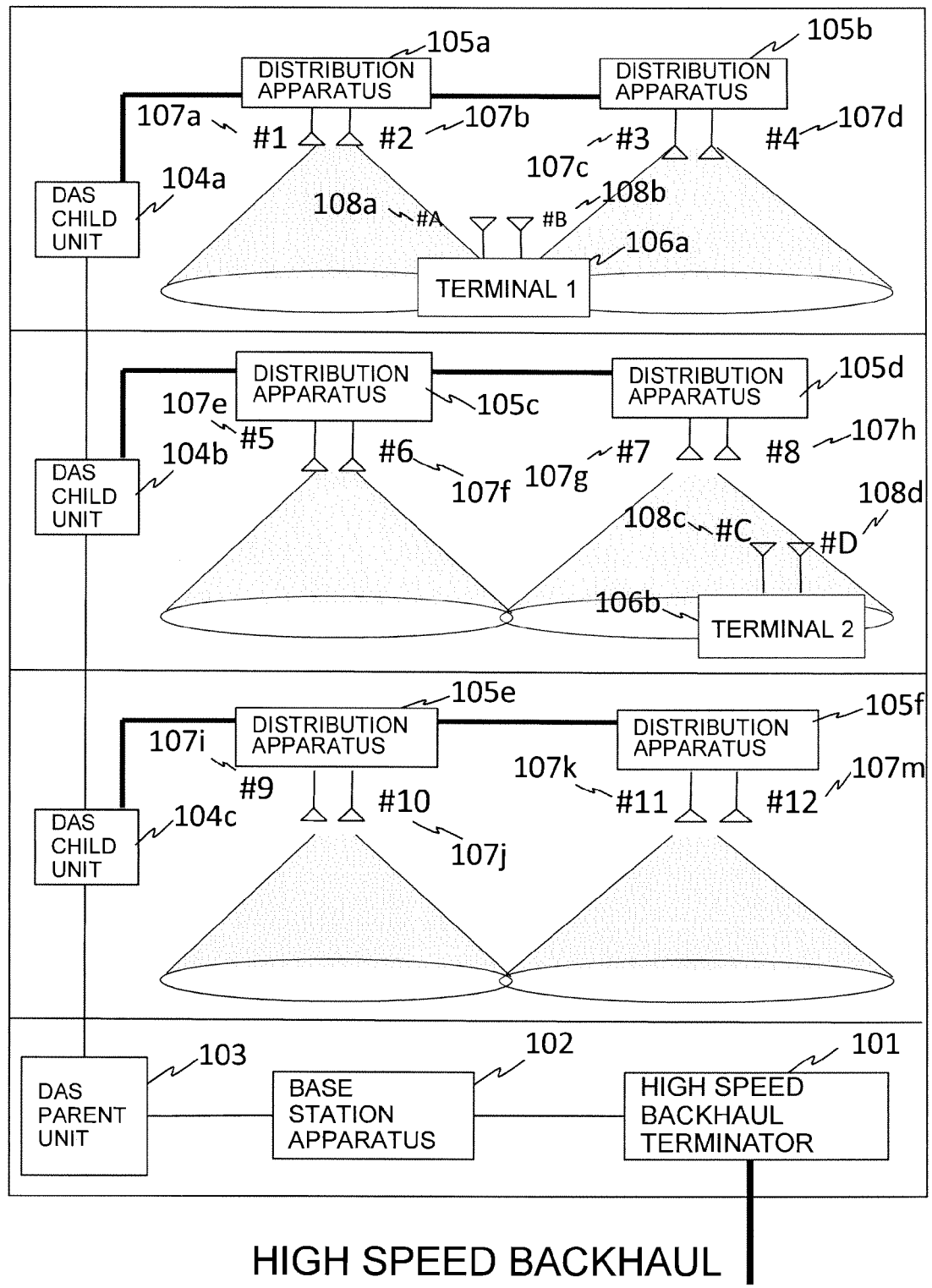
FIG. 1 shows the structure of a distributed antenna system.

Embodiments of the present invention will be described below.
1. First Embodiment
1.1 System and Processing FIG. 1 shows an example structure of a distributed antenna system (DAS) according to a first embodiment of the present invention.

In the system, antennas 107a, 107b, 107c, 107d, 107e, 107f, 107g, 107h, 107i, 107j, 107k, and 107m held by distribution apparatuses 105a, 105b, 105c, 105d, 105e, and 105f are disposed at places spatially distributed. Through a DAS parent unit 103 and DAS child units 104a, 104b, and 104c, input and output signals are transferred between an antenna port of a base station apparatus 102 and each of the antennas 107a, 107b, 107c, 107d, 107e, 107f, 107g, 107h, 107i, 107j, 107k, and 107m held by the distribution apparatuses 105a, 105b, 105c, 105d, 105e, and 105f. The DAS parent unit 103 and the DAS child units 104a, 104b, and 104c perform high speed digital communications using optical fibers. In the communications, a radio analog signal can be transferred as is, or a radio analog signal is converted to a digital signal first and then transferred. For example, a terminal 106a can perform radio communication with the base station apparatus 102 through one or a plurality of antennas 107a and 107b disposed around the terminal 106a to connect to an outside network via a high speed backhaul terminator 101 for Internet connection.

Figure 2:
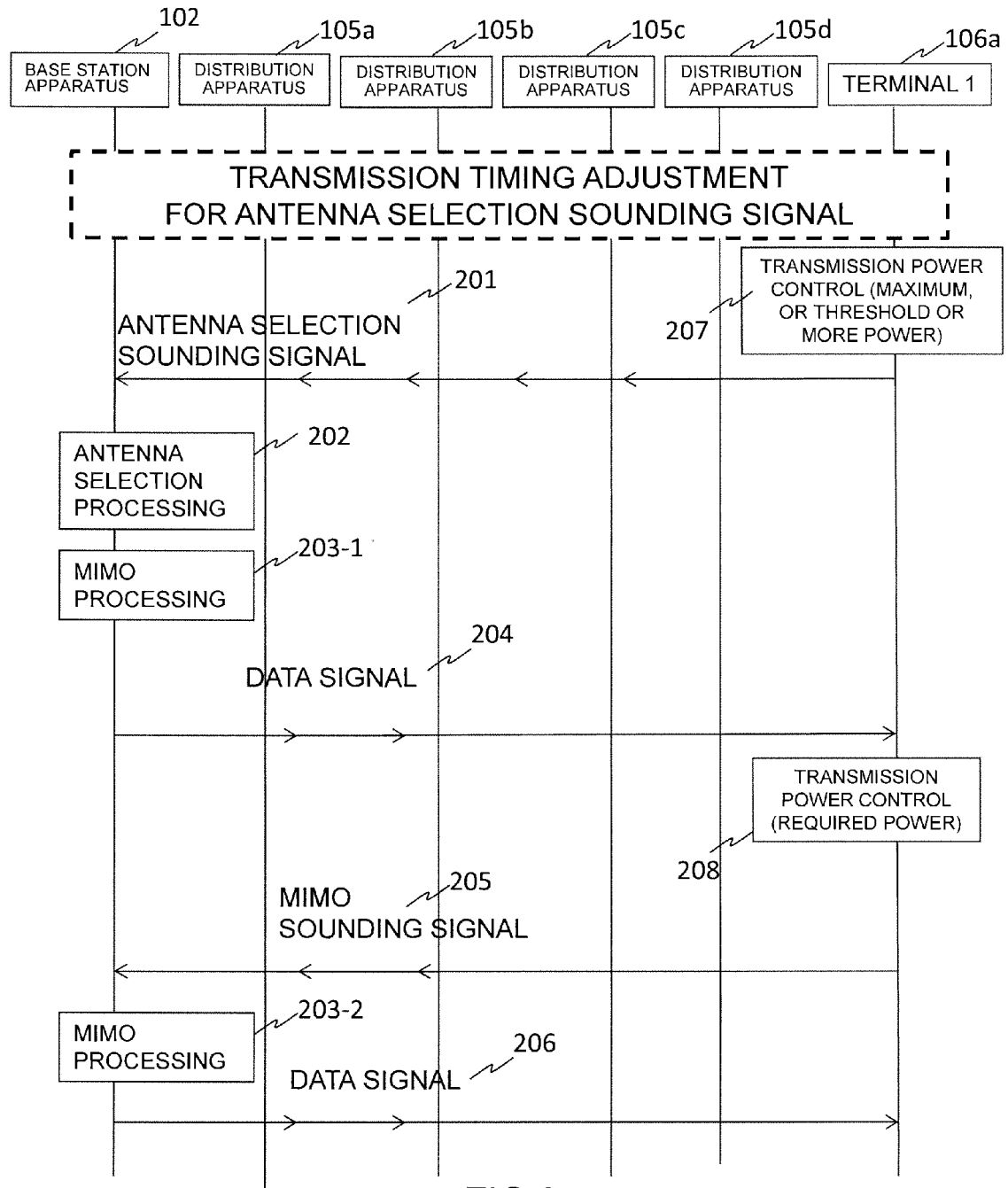
FIG. 2 is a flowchart of how MIMO communication antennas are selected by using an antenna selection sounding signal.

FIG. 2 is a flowchart of how MIMO communication antennas are selected by using an antenna selection sounding signal according to the first embodiment of the present invention.

First, the transmission timing of an antenna selection sounding signal 201 is adjusted between a terminal 1 (106a) and the base station apparatus 102. Details thereof will be described later with reference to FIG. 3.

Then, the terminal 1 (106a) sends the antenna selection sounding signal (antenna selection reference signal) 201 at the adjusted transmission timing with the maximum transmission power or with an antenna selection transmission power threshold or larger. The antenna selection sounding signal 201 is received by the antennas 107a, 107b, 107c, 107d, 107e, 107f, 107g, and 107h held by the distribution apparatuses 105a, 105b, 105c, and 105d, and transferred to the base station apparatus 102 through the DAS child units and the DAS parent unit. The base station apparatus 102 performs antenna selection processing 202 for selecting the number of receiving antennas used in MIMO. For example, a predetermined number of receiving antennas can be selected from antennas that received a predetermined power threshold or larger. The base station apparatus 102 performs channel estimate processing based on the antenna selection sounding signal 201 to collect channel state information (CSI) of radio propagation between the terminal 1 (106a) and the selected antennas. The base station apparatus 102 uses this channel state information (CSI) to generate a data signal (204) for MIMO data communication (data communication data signal) in MIMO processing 203-1. The data signal 204 can be, for example, a signal stipulated in a radio communication standard. Then, the base station apparatus 102 sends the data signal 204 for MIMO data communication through the selected antennas of the distribution apparatus 105a and the distribution apparatus 105b. The terminal 1 (106a) controls the transmission power such that a signal can be received by the selected antennas with a sufficient receiving power and sends an upstream MIMO sounding signal (data communication reference signal) 205. The terminal 1 (106a) can control the transmission power with open loop control or closed loop control with the structure shown in FIG. 8, to be described later. When the base station apparatus 102 receives the MIMO sounding signal 205 from the terminal 1 (106a), the base station apparatus 102 performs the channel estimate processing to update the channel state information (CSI) for radio propagation to the latest information, performs MIMO processing 203-2 with the channel state information, and sends a data signal 206. Hereafter, the base station apparatus 102 repeats MIMO data communication by using the MIMO sounding signal 205 to which the transmission power has been controlled. The terminal 1 (106a) periodically sends the antenna selection sounding signal 201 at predetermined time intervals to select MIMO communication antennas again.

Figure 3:
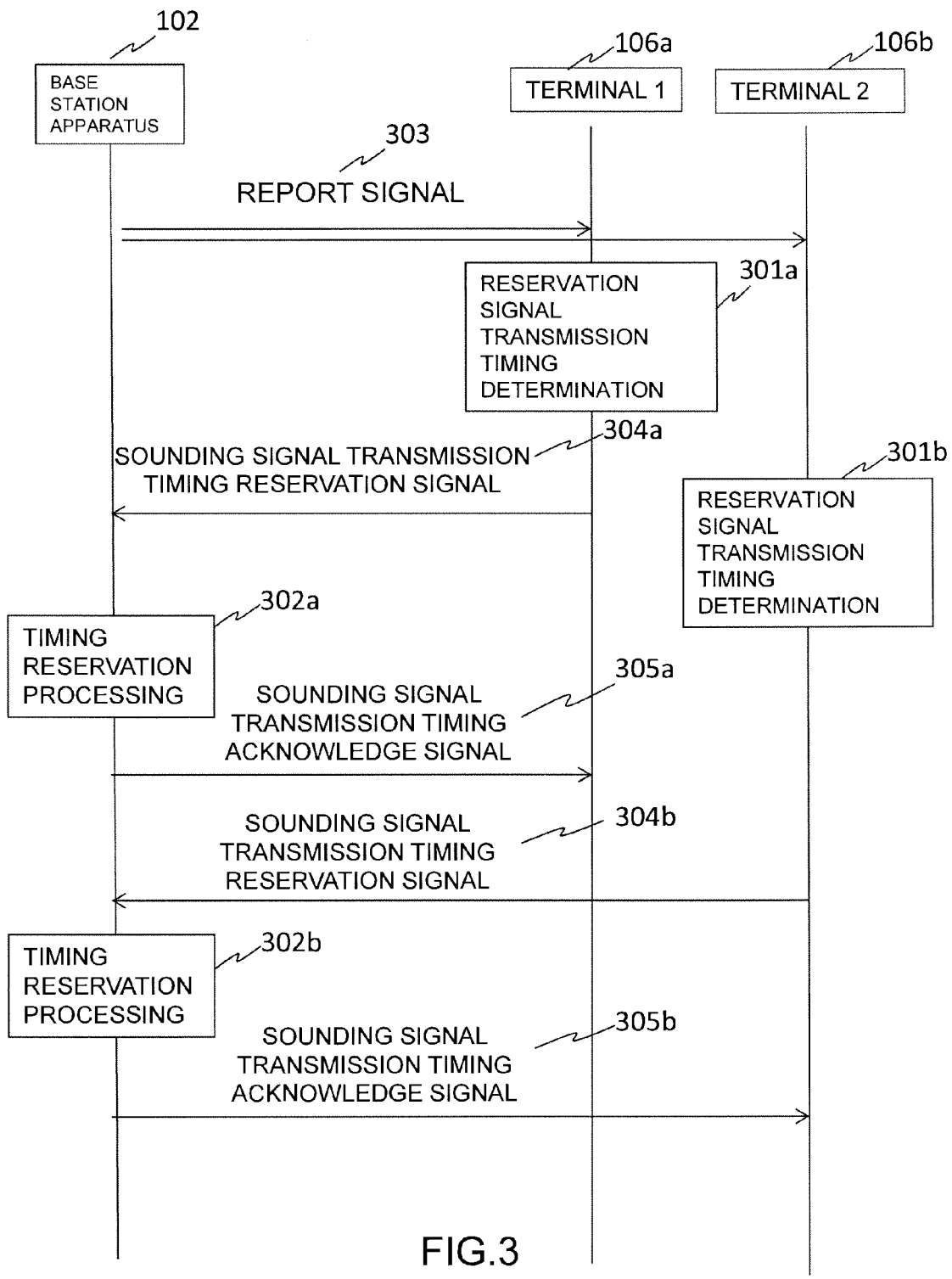
FIG. 3 is a flowchart of how the transmission timing of the antenna selection sounding signal is adjusted.

FIG. 3 is a flowchart of how the transmission timing of the antenna selection sounding signal shown in FIG. 2 is adjusted.

The base station apparatus 102 sends to the terminal 1 (106a) a report signal 303 that includes reservation time slot information used to send the antenna selection sounding signal 201. As described later, the reservation time slot information specifies the transmission timing (transmission time slot) of the terminal. When the terminal 1 (106a) receives the report signal 303, the terminal 1 (106a) specifies a reservation time slot number with a predetermined appropriate method and sends a sounding signal transmission timing reservation signal 304a at the above-described timing specified in the reservation time slot information. In timing reservation processing 302, the base station apparatus 102 searches for an open slot for the antenna selection sounding signal; if a time slot not assigned to the other terminals exists, recognizes that a reservation is possible; and sends a sounding signal transmission timing acknowledge signal 305a that includes a time slot number that can be used for transmission as a set slot number, to the terminal 1 (106a). If all time slots have been assigned to the other terminals, the base station apparatus 102 recognizes that a reservation is not possible and sends a sounding signal transmission timing acknowledge signal 305a to the terminal 1 (106a). When the terminal 1 (106a) receives the sounding signal transmission timing acknowledge signal that shows a reservation is possible, the terminal 1 (106a) sends the antenna selection sounding signal with the determined set slot number with the maximum transmission power or with the antenna selection transmission power threshold or larger. If a reservation is not possible, the terminal 1 (106a) makes a reservation again with a sounding signal transmission timing reservation signal in the next frame.

When the same processes as those described above are applied to a terminal 2 (106b), the antenna selection sounding signal timing is adjusted between the terminal 1 (106a) and the terminal 2 (106b).

FIG. 4 shows example structures of the report signal, the reservation signal, and the acknowledge signal in the first embodiment.

The report signal 303 includes, for example, a header, report information (such as base station ID, another position registration information, channel structure information and/ or system information), and the reservation time slot information (511). The base station apparatus 102 sends the report signal 303 to the terminal 1 (106a). The reservation signals 304a and 304b (304) include, for example, a header that includes data indicating a reservation signal, and a terminal ID. The terminal 1 (106a) sends the reservation signal 304 to the base station apparatus 102.

The acknowledge signals 305a and 305b (305) include, for example, a header that includes data indicating an acknowledge signal, a base station ID, and the set slot number (a third slot in this case). The base station apparatus 102 sends the acknowledge signal 305 to the terminal 1 (106a).

Figure 5:
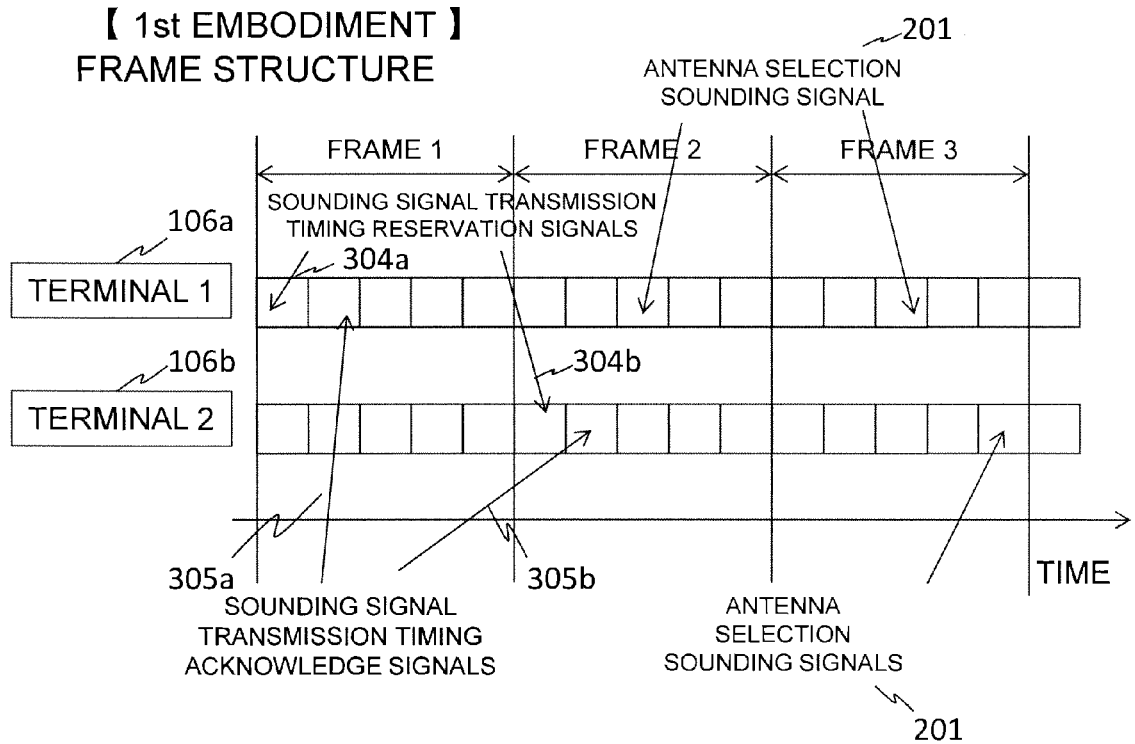
FIG. 5 shows a frame structure related to sounding signal transmission timing reservation signals, sounding signal transmission timing acknowledge signals, and antenna selection sounding signals in the first embodiment.

FIG. 5 shows the positions of the sounding signal transmission timing reservation signals, the sounding signal transmission timing acknowledge signals, and the antenna selection sounding signals in frames.

As described above, the time slot with which the transmission timing of the antenna selection sounding signal is adjusted is known in advance with the report signal 303 (reservation time slot information) sent from the base station apparatus 102. In this example, it is assumed that the first slot in each frame is assigned to a sounding signal transmission timing reservation signal, the second slot is assigned to a sounding signal transmission timing acknowledge signal, and the third, fourth, and fifth slots are assigned to an antenna selection sounding signal. In this example, the terminal 1 (106a) first sends the sounding signal transmission timing reservation signal 304a (to reserve the third slot) at the first slot in frame 1, and then, receives the sounding signal transmission timing acknowledge signal 305a (to specify the third slot) from the base station apparatus 102 at the following second slot. When the terminal 1 (106a) recognizes that the reservation was successful from the sounding signal transmission timing acknowledge signal 305a, the terminal 1 (106a) sends the antenna selection sounding signal 201 at the third slot in the following frame 2.

The terminal 2 (106b) sends the sounding signal transmission timing reservation signal 304b at the first slot in frame 2, and receives the sounding signal transmission timing acknowledge signal 305b (to specify the fifth slot) at the following second slot. The terminal 2 (106b) recognizes from the sounding signal transmission timing acknowledge signal 305b that the transmission timing slot can be the fifth slot, and sends the antenna selection sounding signal 201 at the fifth slot in the following frame 3. Since the terminal 1 (106a) sends the antenna selection sounding signal 201 at the third slot in frame 3 and the terminal 2 (106b) sends the antenna selection sounding signal 201 at the fifth slot, packet collision can be avoided.

To determine how long the transmission timing slot reserved by the terminal 1 (106a) is effective, the base station apparatus 102 may determine information indicating that the slot is effective up to M times, in every N frames and send the information with the sounding signal transmission timing acknowledge signal 305a. Alternatively, the terminal 1 (106a) may send information about N and M, described above, to the base station apparatus 102 with the sounding signal transmission timing reservation signal 304a. Alternatively, once a reservation is made, the transmission timing slot may be effective in every frame; and the terminal or the base station apparatus 102 may explicitly send a control signal called a sounding signal transmission timing reservation releasing signal to release the reservation of the transmission timing slot. The terminal 1 (106a) and the terminal 2 (106b) may perform simultaneous access to send sounding signal transmission timing reservation signals at the first slot in frame 1. If the sounding signal transmission timing reservation signals can be demodulated and decoded at the same time as in code division multiple access (CDMA), it is just necessary to perform the reservation processing for the two terminals and to assign different transmission timing time slots to the two terminals, as described above.

If the sounding signal transmission timing reservation signal sent from one of the two terminals is demodulated and decoded after the simultaneous access, it is just necessary to perform the reservation processing to that one terminal.

If both of the sounding signal transmission timing reservation signals are missing by the simultaneous access, access needs to be performed again after certain random time frames to avoid the collision of sounding signal transmission timing reservation signals.

1.2 Apparatus Structure

Figure 7:
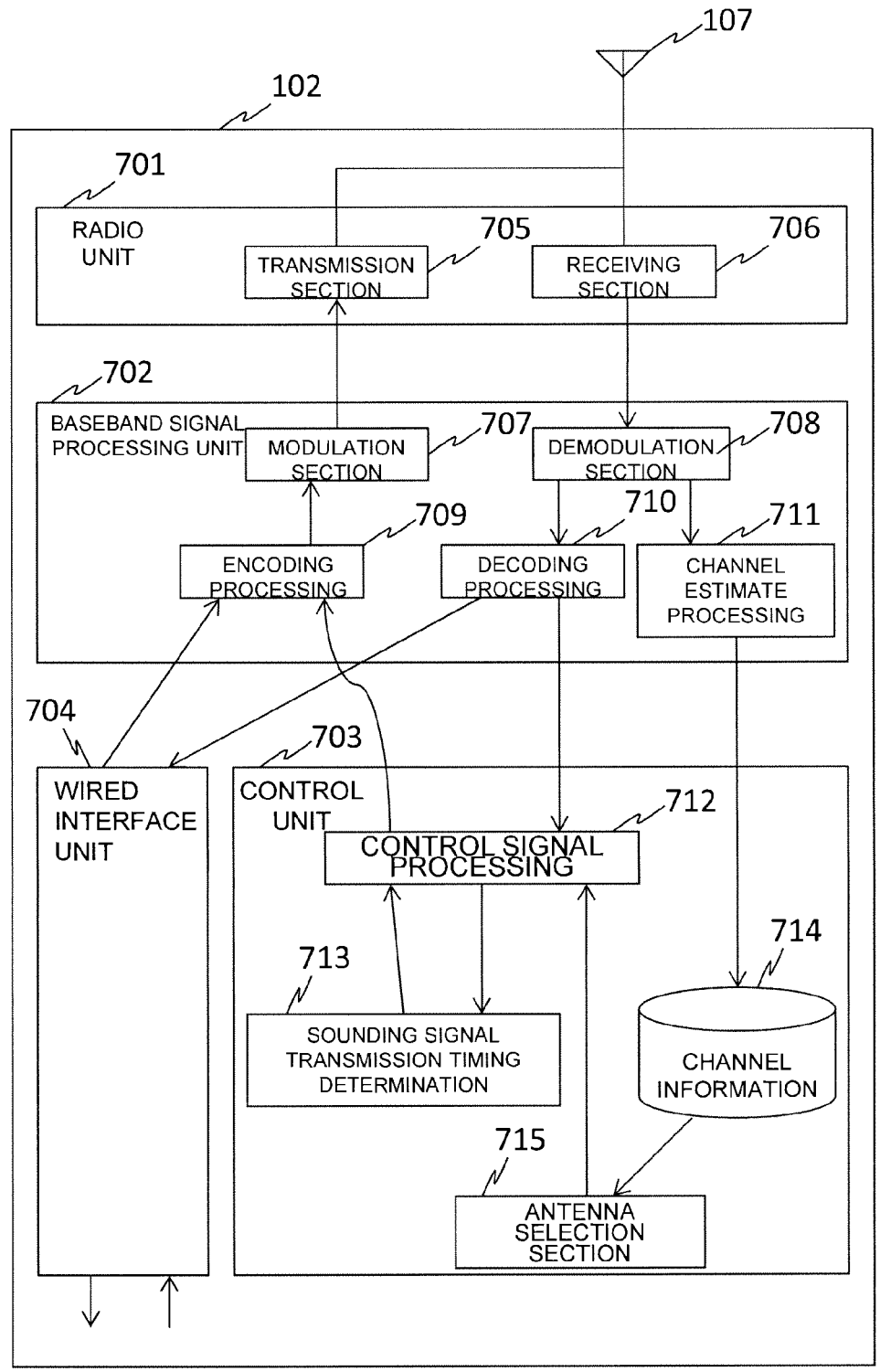
FIG. 7 shows the block structure of a base station apparatus.

FIG. 7 shows an example block structure of the base station apparatus 102 according to the first embodiment of the present invention.

An input signal from an antenna 107 is amplified in power and changed from the analog signal to a digital signal in a receiving section 706 of a radio unit 701 and sent to a baseband signal processing unit 702. A transmission section 705 changes a digital transmission signal sent from the baseband signal processing unit 702 to an analog signal, amplifies the signal in power, and sends the signal to the antenna 107.

The received signal sent from the receiving section 706 of the radio unit 701 is subjected to demodulation processing conforming to the radio communication method in a demodulation section 708 of the baseband signal processing unit 702, and the encoded data is decoded in decoding processing 710. When the decoded data is a control signal, the signal is sent to control signal processing 712 of a control unit 703; when the decoded data is a data signal, the signal is sent to a wired interface unit 704. In the demodulation processing in the demodulation section 708, channel estimate processing 711 measures radio propagation channel information and stores it as channel information 714.

A control signal sent from the control signal processing 712 of the control unit 703 or a data signal sent from the wired interface unit 704 is encoded by an encoding section 709 of the baseband signal processing unit 702, and is subjected to modulation processing conforming to the radio communication method in a modulation section 707, and that transmission signal is sent to the radio unit 701.

The control unit 703 includes the control signal processing 712, sounding signal transmission timing determination 713, the channel information 714, and an antenna selection section 715. The channel selection section 715 selects an effective antenna by using the channel information 714. The sounding signal transmission timing determination 713 determines whether the transmission timing slot for the sounding signal transmission timing reservation signal, sent from the terminal has been assigned to another terminal and reports the determination result to the terminal as the sounding signal transmission timing acknowledge signal, as described with reference to FIG. 3.

The sounding signal transmission timing determination 713 generates a control signal that includes information about a time slot where the terminal may send the sounding signal transmission timing reservation signal, as report information, and the control signal processing 712 sends it to the terminal as a periodic report signal.

The wired interface section 704 exchanges a data signal with the high-speed backhaul terminator 101 and performs data transmission and receiving processing with the baseband signal processing unit 702.

Figure 8:
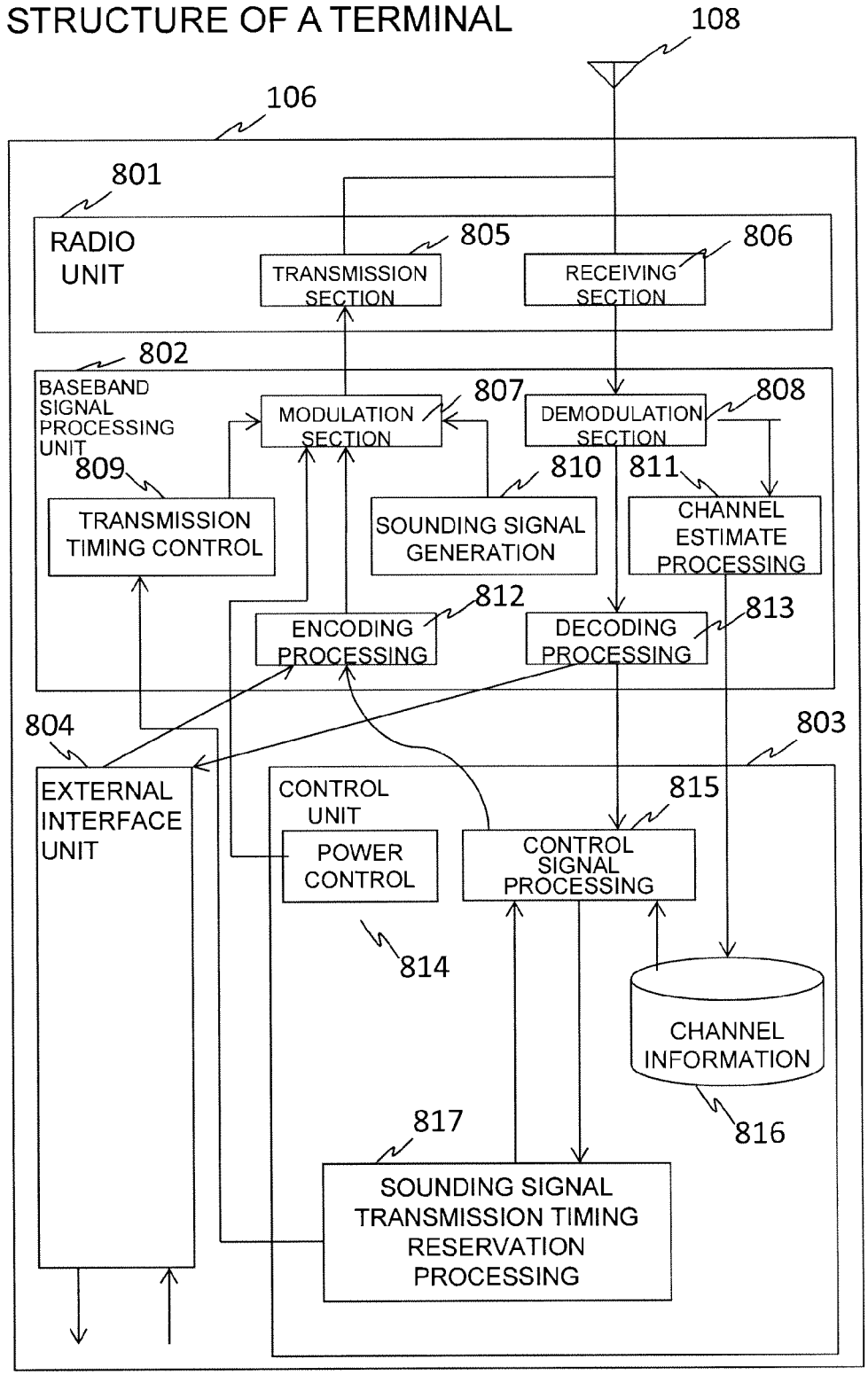
FIG. 8 shows the block structure of a terminal in the first embodiment.

FIG. 8 is an example block structure of the terminal 106 according to the first embodiment of the present invention.

An input signal from an antenna 108 is amplified in power and changed from the analog signal to a digital signal in a receiving section 806 of a radio unit 801 and sent to a baseband signal processing unit 802. A transmission section 805 changes a digital transmission signal sent from the baseband signal processing unit 802 to an analog signal, amplifies the signal in power, and sends the signal to the antenna 108.

The received signal sent from the receiving section 806 of the radio unit 801 is subjected to demodulation processing conforming to the radio communication method in a demodulation section 808 of the baseband signal processing unit 802, and the encoded data is decoded in decoding processing 813. When the decoded data is a control signal, the signal is sent to control signal processing 815 of a control unit 803; when the decoded data is a data signal, the signal is sent to an external interface unit 804. In the demodulation processing in the demodulation section 808, channel estimate processing 811 measures radio propagation channel information and stores it as channel information 816.

Sounding signal generation 810 generates an antenna selection sounding signal and a MIMO communication sounding signal. The generated sounding signal is sent at a transmission timing specified by transmission timing control 809. The transmission timing control 809 sends the sounding signal at a transmission possible timing according to the result of sounding signal transmission timing reservation processing 817 of the control unit 803.

A control signal sent from the control signal processing 815 of the control unit 803 or a data signal sent from the external interface unit 804 is encoded by an encoding processing section 812 of the baseband signal processing unit 802, and is subjected to modulation processing conforming to the radio communication method in a modulation section 807, and that transmission signal is sent to the radio unit 801.

The control unit 803 includes the control signal processing 815, power control 814, the sounding signal transmission timing reservation processing 817, and the channel information 816.

The sounding signal transmission timing reservation processing 817 performs processing for reserving a transmission timing slot for the sounding signal transmission timing reservation signal sent from the terminal, as described with reference to FIG. 3 (especially, 301a).

The power control 814 controls the transmission power of the transmission signal modulated and output by the modulation section 807 of the baseband signal processing unit 802. The transmission power is controlled such that the antenna selection sounding signal 201 is sent with the maximum transmission power or with the antenna selection transmission power threshold or larger and the MIMO sounding signal 205 reaches the selected antennas with a sufficient power. This transmission power control can be implemented with a method conforming to the radio communication standard. For example, in open loop control, the propagation loss between the base station apparatus 102 and the terminal is calculated from the transmission power sent by the base station apparatus 102 and the receiving power, the transmission power sent by the terminal and received by the base station apparatus is estimated from the above propagation loss, and the transmission power of the terminal is determined such that the base station apparatus can receive with a receiving power equal to or larger than a given value. In closed loop transmission power control, the base station apparatus 102 measures the quality of the receiving power; if the receiving quality becomes lower than a reference value, the base station apparatus 102 instructs the terminal to increase the transmission power, with a control signal, and the terminal follows the instruction; and if the receiving quality at the base station apparatus 102 is equal to or larger than the reference value, the base station apparatus 102 instructs the terminal to reduce the transmission power, with a control signal, and the terminal follows the instruction.

The external interface unit 804 performs interface conversion processing related to data exchanges between the outside and the baseband signal processing unit 802. As an external interface, the USB connection, the Ethernet (registered trademark) connection, or the PCMCIA interface can be used. Signal processing conforming to each interface standard is performed.

1.3 Transmission Power and Antenna Selection

Figure 10:
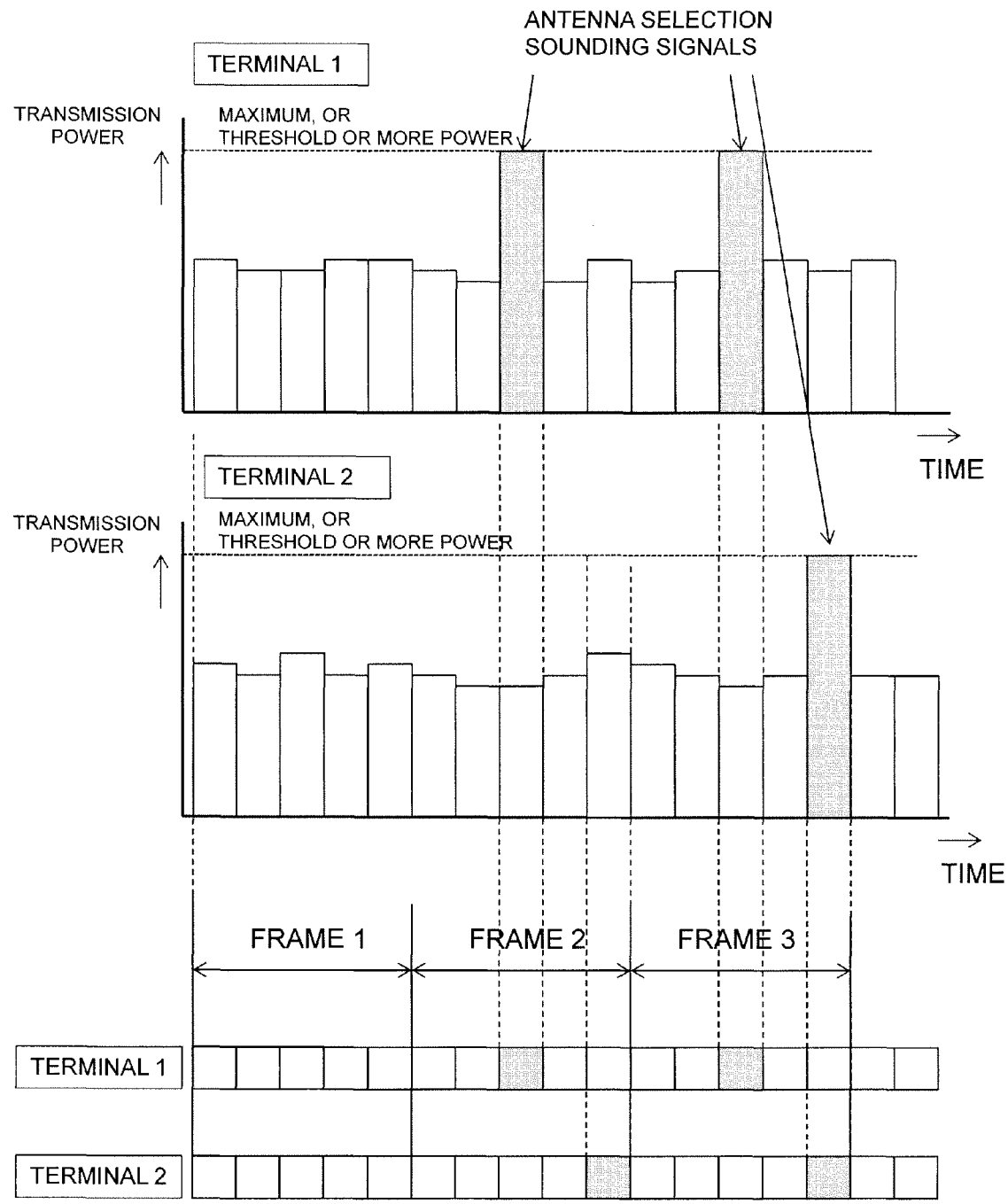
FIG. 10 shows the transmission power of terminals in the first embodiment.

FIG. 10 shows the transmission power of terminals according to the first embodiment of the present invention.

The figure shows the transmission power of the terminal 1 (106a) and the terminal 2 (106b) in each frame. As described with reference to FIG. 5, when the terminal 1 (106a) reserves the transmission timing of an antenna selection sounding signal in frame 1, the terminal 1 (106a) sends the antenna selection sounding signal in the third slots in frames 2 and 3 with the maximum transmission power or with a predetermined transmission power threshold (antenna selection transmission power threshold) which is larger than the data communication power, or larger; and the terminal 2 (106b) reserves an antenna selection sounding signal in frame 2, and the terminal 2 (106b) sends the antenna selection sounding signal in the fifth slot in frame 3 with the maximum transmission power or with the antenna selection transmission power threshold or larger.

In this example, data communication is performed for the selected antenna with the required minimum transmission power except for the slots when the antenna selection sounding signals are sent. In this way, to allow antenna re-selection even during data communication, an antenna selection sounding signal is sent with the maximum transmission power or with the antenna selection transmission power threshold or larger.

Figure 11:
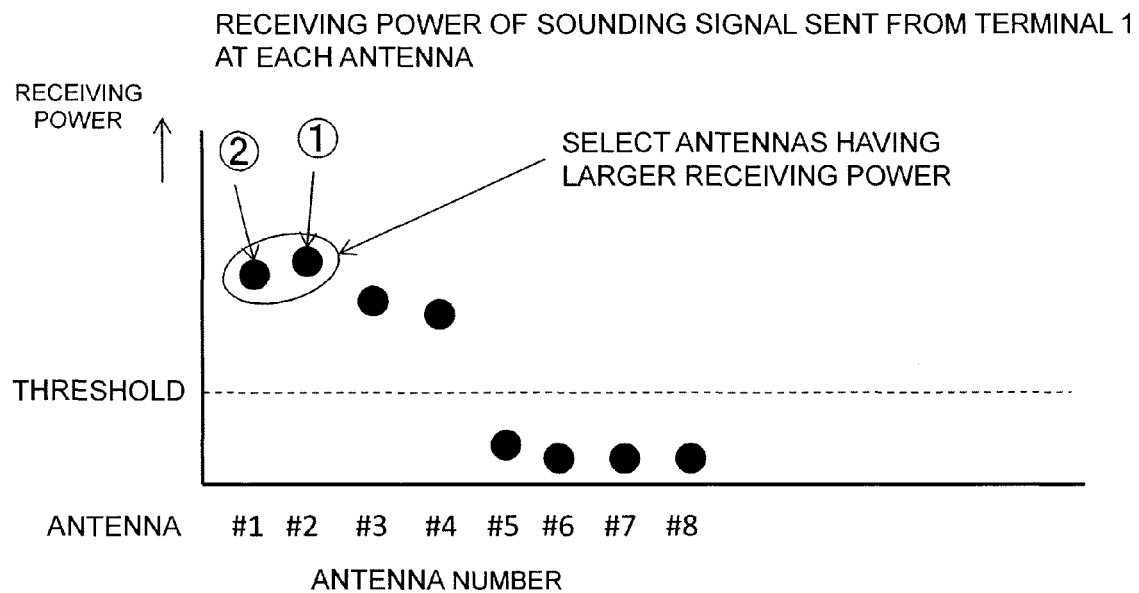
FIG. 11 shows antenna selection processing in the first and second embodiments.

FIG. 11 shows example antenna selection processing in the first embodiment of the present invention.

The figure shows, when a terminal sends an antenna selection sounding signal with the maximum transmission power or with the antenna selection transmission power threshold or larger, the receiving power level of the sounding signal at each antenna of the base station apparatus.

The base station apparatus selects a plurality of antennas having a receiving power threshold or larger of the antenna selection sounding signal, and then, selects the number of antennas required for MIMO communication in descending order of receiving power.

2. Second Embodiment

In a second embodiment, carrier sense processing is used, instead of the processing shown in FIG. 2 in the first embodiment, to adjust the transmission timing of an antenna selection sounding signal.

Figure 14:
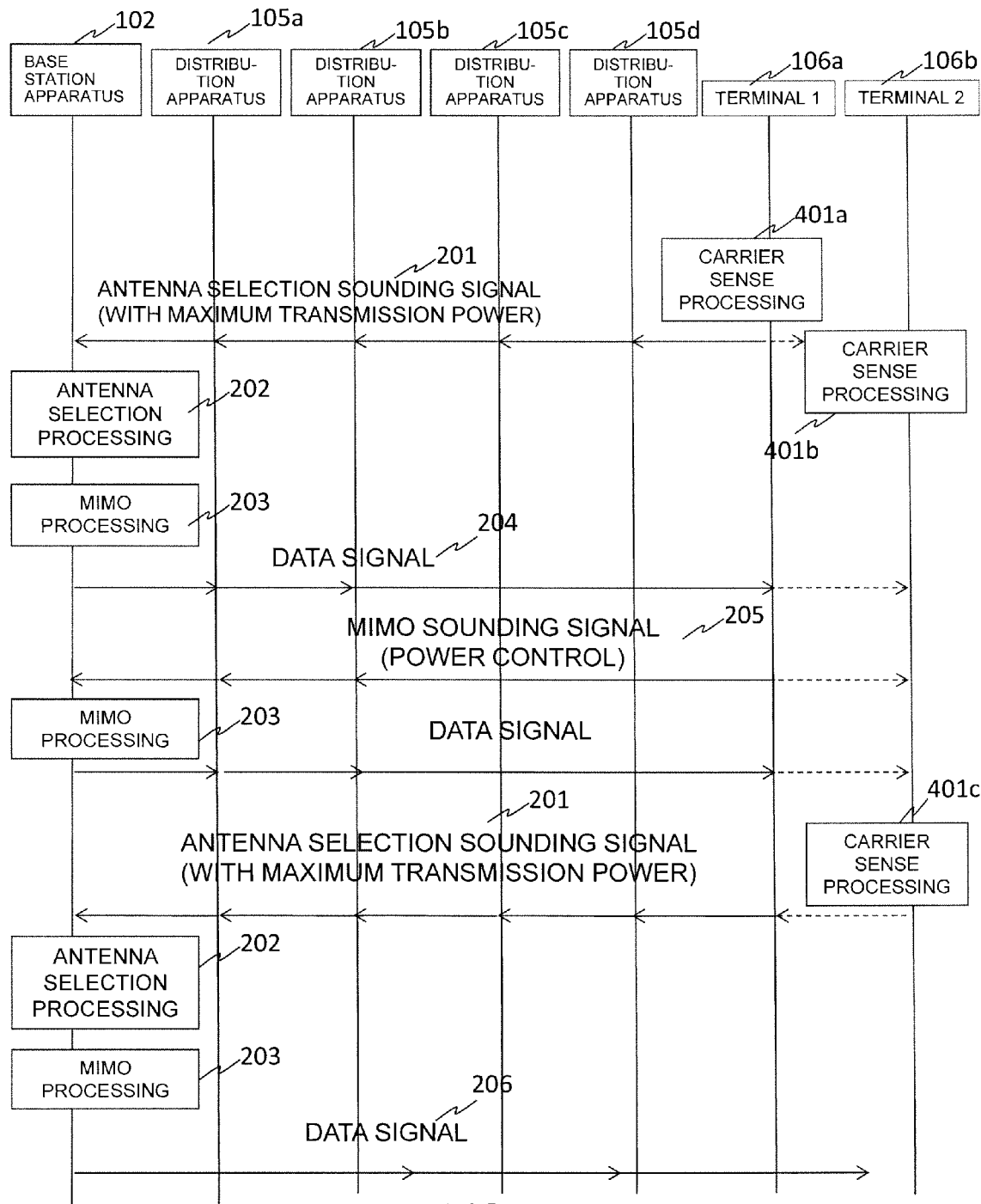
FIG. 14 is a flowchart of how carrier sense processing is used to adjust the transmission timing of an antenna selection sounding signal in the second embodiment.

FIG. 14 is a flowchart of how carrier sense processing is used to adjust the transmission timing of an antenna selection sounding signal, according to the second embodiment.

The terminal 1 (106a) uses carrier sense processing 401a to determine whether another terminal is sending a signal. Specifically, the receiving power in the communication bandwidth is measured; when the receiving power is equal to or higher (higher) than a threshold, it is determined that another terminal is sending a signal; and when the receiving power is lower (equal to or lower) than the threshold, it is determined that another terminal is not sending a signal. When it is determined that another terminal is not sending a signal, the terminal 1 (106a) sends an antenna selection sounding signal with the maximum transmission power or with the antenna selection transmission power threshold or larger. The same processing as in FIG. 3 is performed after the base station apparatus 102 receives the antenna selection sounding signal.

In the same way, the terminal 2 (106b) uses carrier sense processing 401b to determine whether another terminal is sending a signal. When it is determined that another terminal is not sending a signal, the terminal 2 (106b) sends an antenna selection sounding signal with the maximum transmission power or with the antenna selection transmission power threshold or larger. With carrier sense multiple access (CSMA), even when an antenna selection sounding signal is sent with the maximum transmission power or with the antenna selection transmission power threshold or larger, packet collision is avoided in this manner.

Figure 6:
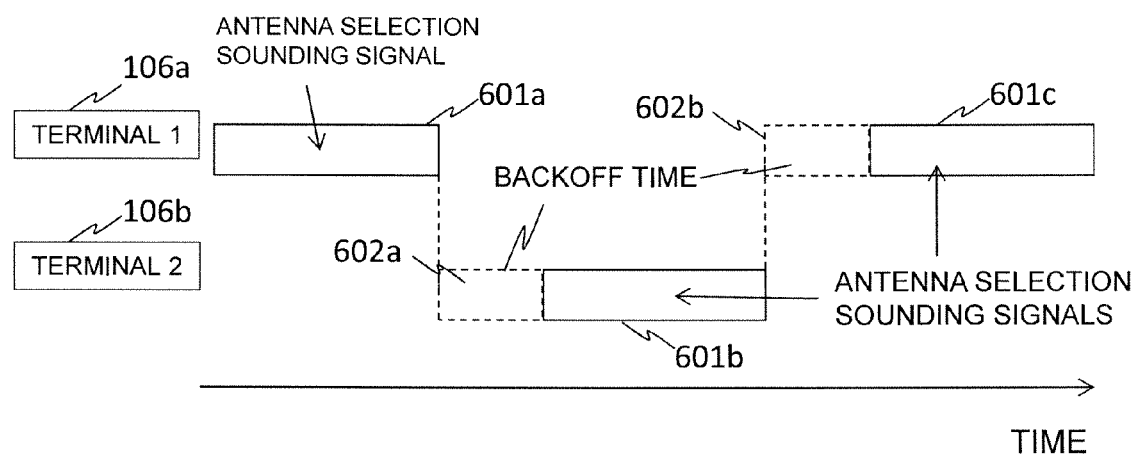
FIG. 6 shows how antenna selection sounding signals avoid colliding with each other with the use of carrier sensing in a second embodiment.

FIG. 6 shows how antenna selection sounding signals avoid colliding with each other with the use of carrier sensing.

The terminal 1 (106a) performs carrier sensing. When the terminal 1 (106a) determines that another terminal is not sending a signal, the terminal 1 (106a) sends an antenna selection sounding signal 601a with the maximum transmission power or with the antenna selection transmission power threshold or larger. During this transmission, the terminal 2 (106b) determines through carrier sensing that the terminal 1 (106a) is sending a signal, the terminal 2 (106b) waits for a given backoff time period 602a. When the backoff time period elapses, the terminal 2 (106b) performs carrier sensing. The terminal 2 (106b) determines that another terminal is not sending a signal, and sends an antenna selection sounding signal 601b with the maximum transmission power or with the antenna selection transmission power threshold or larger.

In access control with backoff time periods (602a and 602b), when the channel is used, each terminal enters a transmission waiting state; and when the channel becomes open, the terminal starts data communication. If a plurality of terminals which waited for the channel to be open starts transmission simultaneously, packets collide at a high possibility. To avoid such a situation as much as possible, when the channel becomes open, each terminal generates a random number and is made to wait for a period corresponding to the generated random number before transmission.

Figure 9:
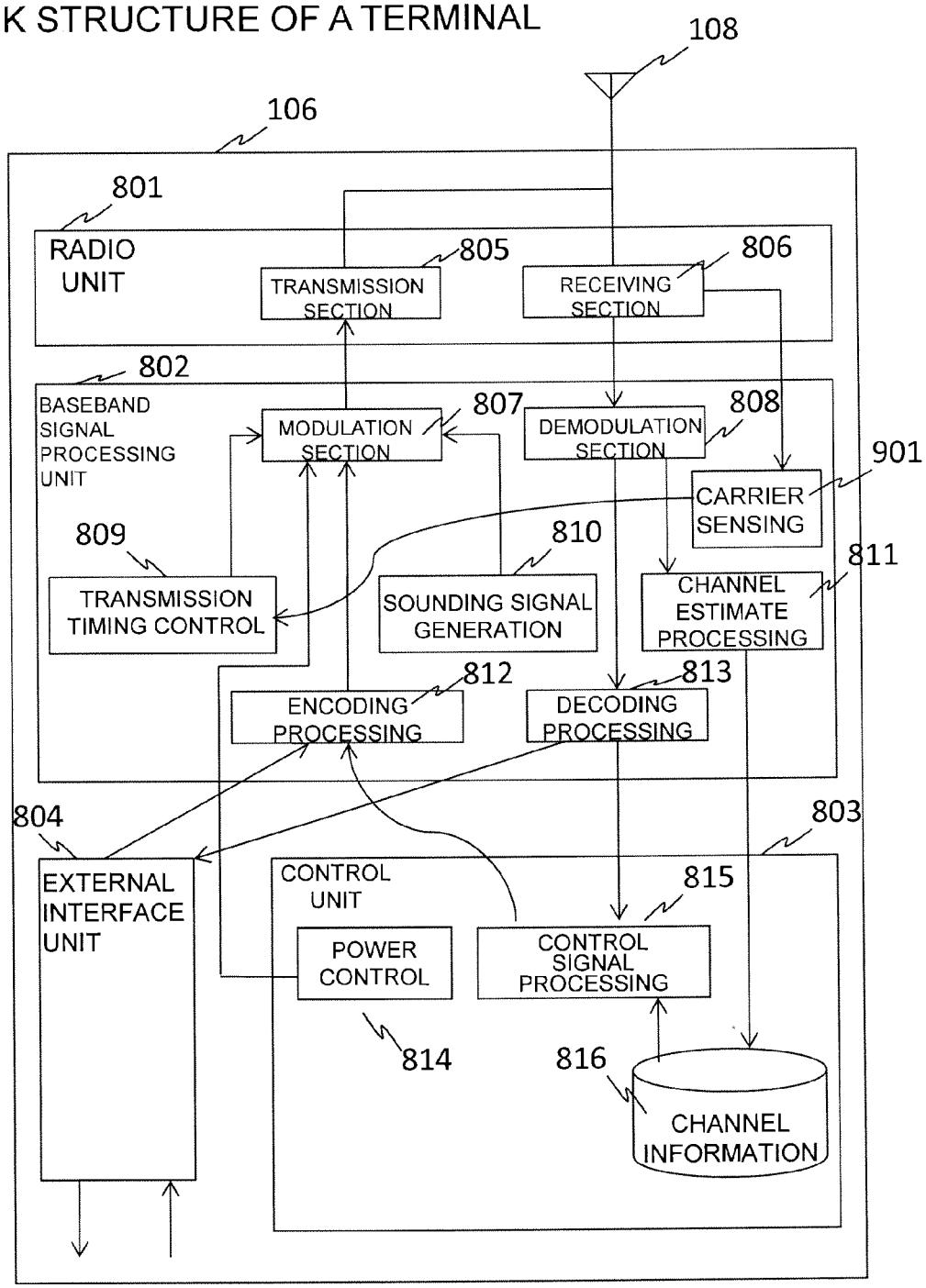
FIG. 9 shows the block structure of a terminal in the second embodiment.

FIG. 9 is an example block structure of the terminal 2 according to the second embodiment of the present invention.

The difference from the block structure of the first embodiment shown in FIG. 8 is as follows: The baseband signal processing unit 802 includes carrier sensing 901 to determine the transmission timing of an antenna selection sounding signal in FIG. 9, whereas the control unit 803 includes the sounding signal transmission timing reservation processing 817 in FIG. 8. When the carrier sensing 901 determines that another terminal is sending a signal, the carrier sensing 901 sends the determination to the transmission timing control 809 of the baseband signal processing unit 802 to suspend the transmission of an antenna selection sounding signal and wait for the backoff time period; and when the carrier sensing 901 determines that another terminal is not sending a signal, the transmission timing control 809 allows the antenna selection sounding signal to be transmitted.

The other functions are the same as those in FIG. 8.

3. Third Embodiment

In a third embodiment, a reference signal is used, instead of the MIMO communication sounding signal shown in FIG. 2 in the first embodiment, to perform antenna selection.

Figure 12:
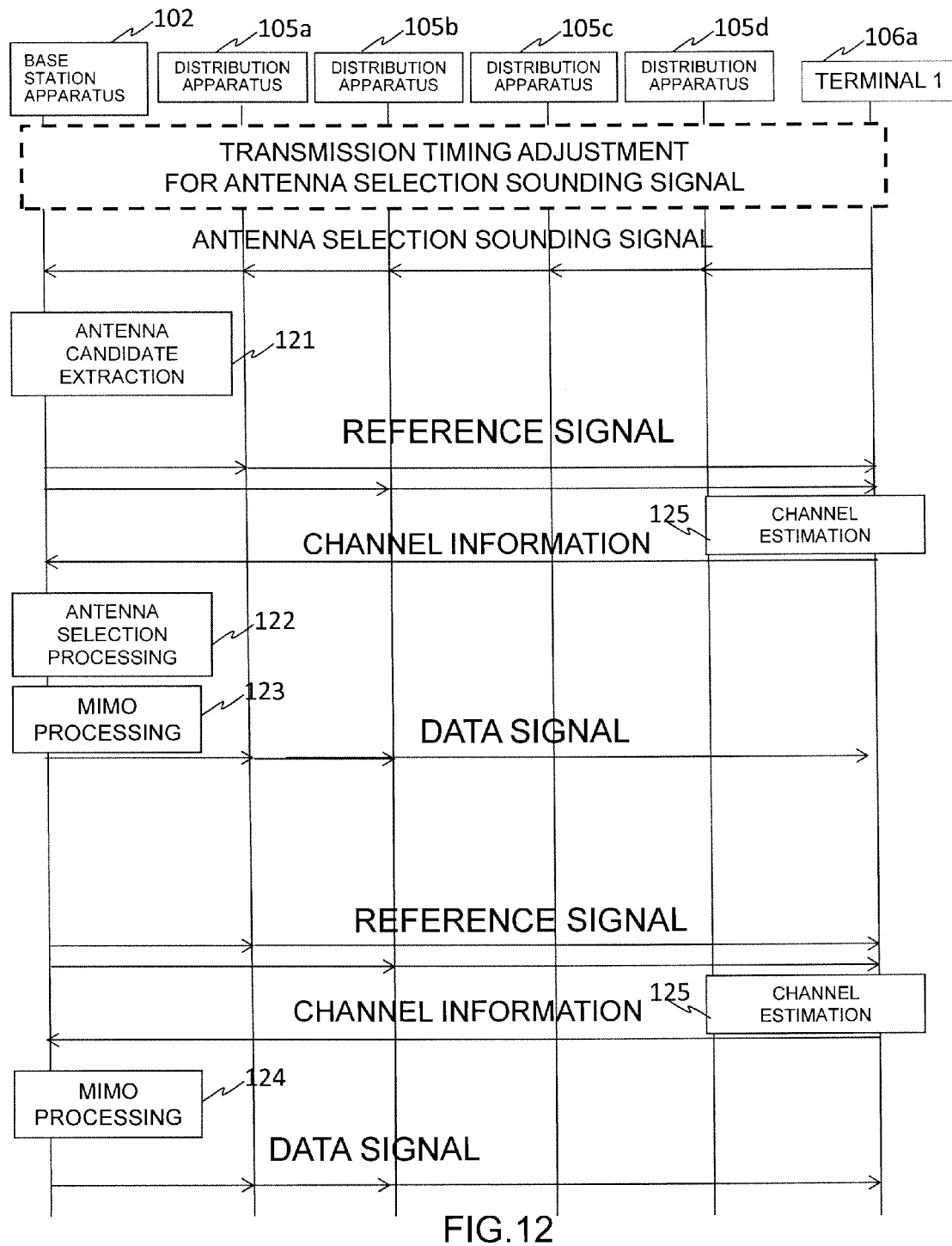
FIG. 12 is a flowchart of how antenna selection is performed by using a reference signal in a third embodiment.

FIG. 12 is a flowchart of how antenna selection is performed by using the reference signal according to the third embodiment.

In the same way as in FIG. 2, the terminal 106a sends an antenna selection sounding signal. The base station apparatus 102 receives the antenna selection sounding signal, extracts antennas obtaining a receiving power threshold or more as candidates (121), and sends reference signals from the extracted antenna candidates to the terminal. In this example, antennas of the distribution apparatuses 105a and 105b are extracted as candidates, and the reference signals are sent from these antennas of the distribution apparatuses. The terminal receives the reference signals, performs channel estimation 125, and sends channel information to the base station apparatus 102 as feedback. The base station apparatus 102 calculates the eigenvalues of the radio propagation channel acknowledge matrixes corresponding to the combinations of antennas according to the channel information with the combinations of antennas being taken into consideration, and selects antennas from the combination of antennas having a large sum of eigenvalues (122). The base station apparatus 102 uses the selected antennas to perform MIMO processing 123 and sends a data signal to the terminal.

Figure 13:
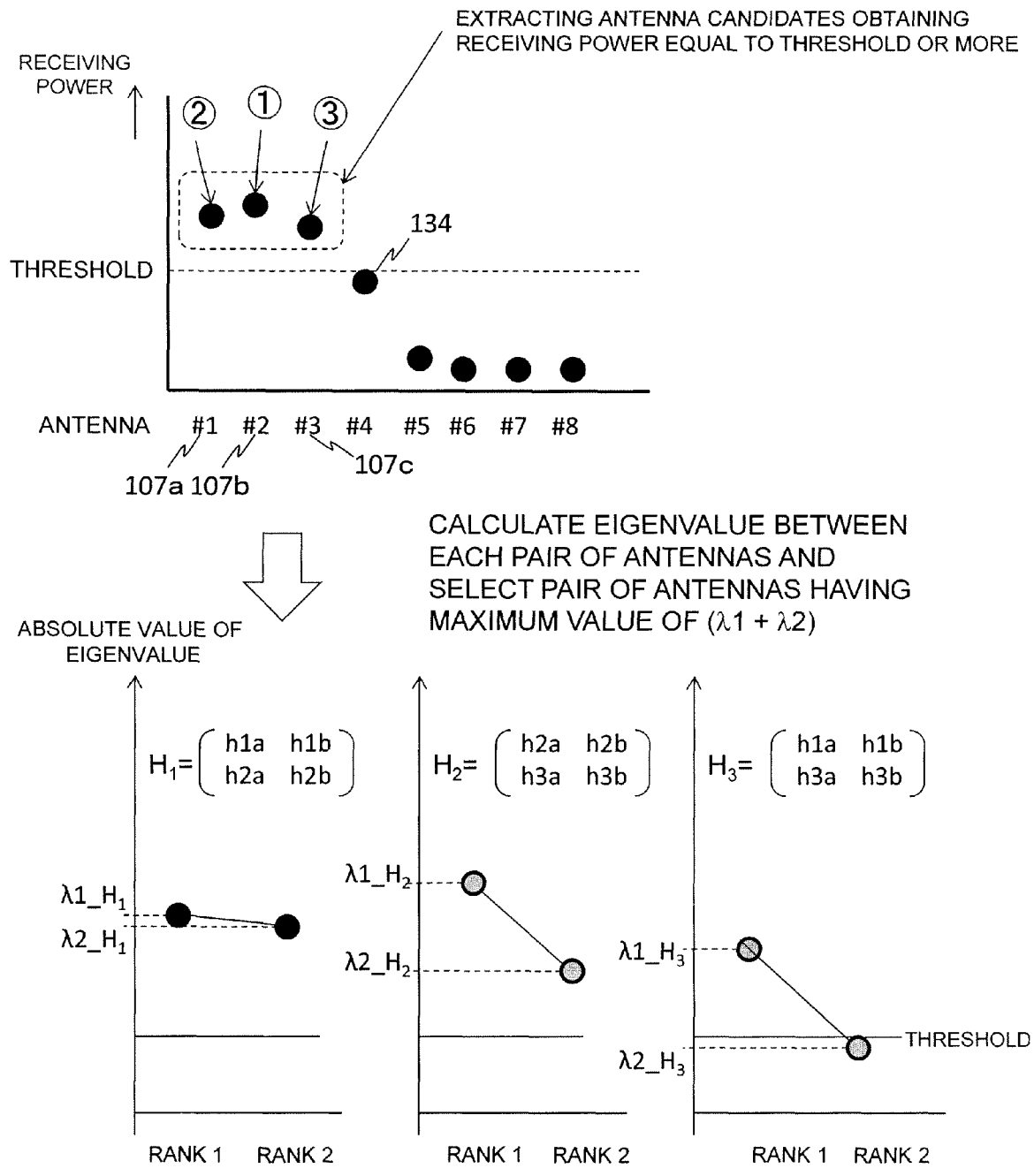
FIG. 13 shows antenna selection processing in the third embodiment.

FIG. 13 shows the antenna selection processing in FIG. 12.

In the figure, the receiving power levels of the antennas of the base station apparatus when the antenna selection sounding signal is received from the terminal are indicated, and an antenna #1 (107a), an antenna #2 (107b), and an antenna #3 (107c) obtaining the receiving power threshold or more are extracted as candidates. From FIG. 1, since the distribution apparatus 105a has the antenna #1 (107a) and the antenna #2 (107b), and the distribution apparatus 105b has the antenna #3 (107c), the distribution apparatus 105a and the distribution apparatus 105b send reference signals. Received channel information is defined for the reference signal sent from the antenna #1 (107a) of the distribution terminal 105a as follows: channel information received by antenna #A (108a) of the terminal 1 (106a) is defined as h1a, and channel information received by antenna #B (108b) of the terminal 1 (106a) is defined as h1b.

The channel matrix $H_1$ among the antenna #1 (107a) and the antenna #2 (107b) of the distribution apparatus 105a and antenna #A (108a) and antenna #B (108b) of the terminal 1 (106a) can be expressed by the following expression 1.

$$H_1 = \begin{pmatrix} h_{1a} & h_{1b} \\ h_{2a} & h_{2b} \end{pmatrix} \quad \text{(expression 1)}$$

In the same manner, the channel matrix $H_2$ among the antenna #2 (107b) of the distribution apparatus 105a, the antenna #3 (107c) of the distribution apparatus 105b, and antenna #A (108a) and antenna #B (108b) of the terminal 1 (106a) can be expressed by the following expression 2.

$$H_2 = \begin{pmatrix} h_{2a} & h_{2b} \\ h_{3a} & h_{3b} \end{pmatrix} \quad \text{(expression 2)}$$

In the same manner, the channel matrix $H_3$ among the antenna #1 (107a) of the distribution apparatus 105a, the antenna #3 (107c) of the distribution apparatus 105b, and antenna #A (108a) and antenna #B (108b) of the terminal 1 (106a) can be expressed by the following expression 3.

$$H_3 = \begin{pmatrix} h_{1a} & h_{1b} \\ h_{3a} & h_{3b} \end{pmatrix} \quad \text{(expression 3)}$$

Eigenvalue decomposition is applied to these channel matrixes $H_1$, $H_2$, and $H_3$, and the combination of antennas having the largest sum of eigenvalues is calculated. For example, when the channel matrix $H_2$ has the largest sum of eigenvalues, the antenna #2 (107b) of the distribution apparatus 105a and the antenna #3 (107c) of the distribution apparatus 105b are selected as the antennas required for MIMO communication.

Modification

In the antenna selection method of the third embodiment shown in FIG. 13, under the condition that eigenvalues are equal to or larger than a threshold, the differences between the eigenvalues may be checked to select the combination of antennas having the smallest difference between the eigenvalues. For example, when the channel matrix $H_1$ has the smallest difference between the eigenvalues, the antenna #1 (107a) and the antenna #2 (107b) of the distribution apparatus 105a are selected as the antennas required for MIMO communication.

4. Fourth Embodiment

Figure 15:
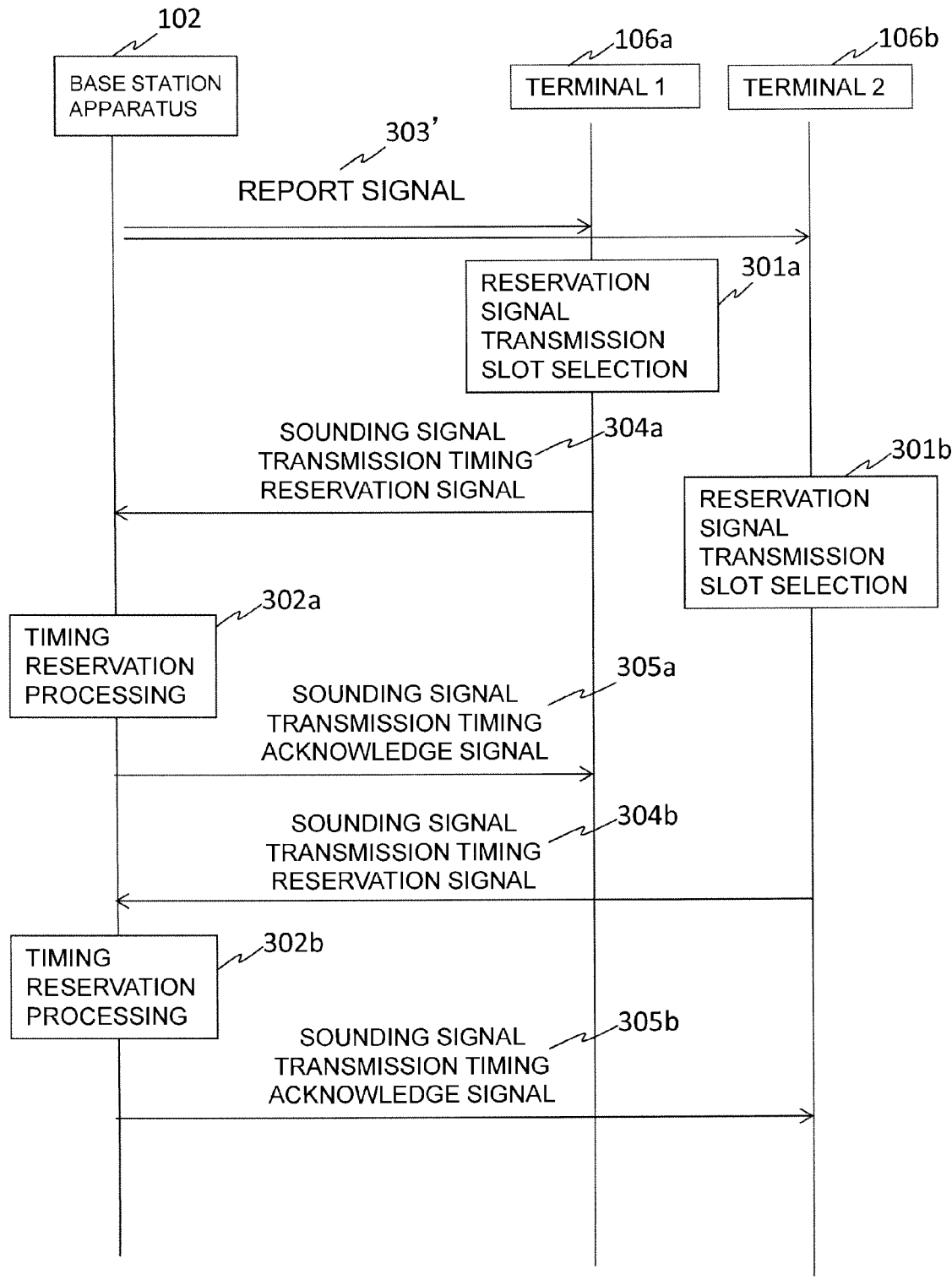
FIG. 15 is a flowchart of how the transmission timing of an antenna selection sounding signal is adjusted in a fourth embodiment.

FIG. 15 is a flowchart of how the transmission timing of the antenna selection sounding signal is adjusted in a fourth embodiment of the present invention.

In the fourth embodiment, a terminal determines the number of a slot to be used and reserves the slot in the base station apparatus, whereas the base station apparatus determines an open slot for sending an antenna selection sounding signal in FIG. 3 and FIG. 5 in the first embodiment.

The base station apparatus 102 sends a report signal 303' that includes information about open slots for sending an antenna selection sounding signal (transmission possible open time slots) (for example, third, fourth, and fifth time slots) to terminals. When the terminal 1 (106a) receives the report signal, the terminal 1 (106a) selects the number of a slot to be used (for example, the fourth slot) among the open slots (301a) and sends a sounding signal transmission timing reservation signal 304a that includes the selected slot number to the base station apparatus (304a). The number of a slot to be used can be selected by an appropriate method, for example, in numerical order or at random. When the base station apparatus 102 receives the sounding signal transmission timing reservation signal 304a, the base station apparatus 102 determines whether the slot having the specified slot number is available; and if that slot is available, reserves the slot (for example, reserves the fourth slot), in transmission timing reservation processing 302a. When the base station apparatus 102 receives sounding signal transmission timing reservation signals 304 at the same time from two or more terminals and an identical slot number is specified, the base station apparatus 102 selects one terminal at random, or selects a terminal for which a reservation comes earlier and processing is performed earlier and make the reservation. After the base station apparatus makes the reservation in the transmission timing reservation processing 302a as described above, the base station apparatus sends a sounding signal transmission timing acknowledge signal 305a that includes information indicating whether the reservation result is successful or not and information indicating the reserved slot number when the result is successful, to the terminal 1 (106a) (305a). When the terminal 1 (106a) receives the sounding signal transmission timing acknowledge signal 305a, the terminal 1 (106a) checks whether the specified slot number has been successfully reserved or not, and sends an antenna selection sounding signal with the maximum transmission power or with the antenna selection transmission power threshold or larger when the specified slot number has been successfully reserved.

The sounding signal transmission timing acknowledge signal 305a may include only data indicating that the reservation has been made successfully or not, without including information about the reserved slot number.

FIG. 16 shows the report signal, the reservation signal, and the acknowledge signal in the fourth embodiment.

The report signal 303 includes, for example, a header, report information (such as base station ID, another position registration information, channel structure information and/or system information), and transmission possible open slot information. The base station apparatus 102 sends the report signal 303 to the terminal 1 (106a).

The reservation signals 304a and 304b (304) include, for example, a header that includes data indicating a reservation signal, a terminal ID, and a reserved slot number (the fourth slot in this case). The terminal 1 (106a) sends the reservation signal 304 to the base station apparatus (102).

The acknowledge signals 305a and 305b (305) include, for example, a header that includes data indicating an acknowledge signal, a base station ID, and the specified slot number (the fourth slot in this case). The base station apparatus 102 sends the acknowledge signal 305 to the terminal 1 (106a). Instead of the specified slot number, data indicating whether the reservation has been made successfully or not may be included.

The sounding signals have been mainly described above. Any appropriate reference signals can be used. The present invention can also be applied to various data communications such as SIMO, in addition to MIMO.

The present invention can also be applied to various distributed antenna systems where a plurality of antennas are distributed and disposed, in addition to so-called DASs.

What is claimed is:

1. A distributed antenna system comprising:
a base station apparatus having a plurality of antennas;
a terminal having a plurality of antennas; and
a plurality of distribution apparatuses accommodating one or a plurality of antennas, the plurality of distribution apparatuses being distributed spatially and disposed;
the base station apparatus and the terminal adjusting a transmission time slot or a transmission timing for sending an antenna selection reference signal;
the terminal sending the antenna selection reference signal in the adjusted time slot or the adjusted transmission timing with the maximum transmission power or with a predetermined antenna selection transmission power threshold which is larger than data communication power, or larger;
the base station apparatus receiving the antenna selection reference signal with the plurality of antennas of each distribution apparatus and performing antenna selection processing for selecting one or a plurality of antennas to be used, according to the receiving strength or receiving state of the antenna selection reference signal;
the base station apparatus obtaining channel information for radio propagation between the terminal and the one or the plurality of antennas selected, according to the antenna selection reference signal, and generating and sending a data signal for data communication by using the channel information;
the terminal controlling transmission power such that a signal reaches the one or the plurality of antennas selected, with a sufficient receiving power, and reporting a data communication reference signal; and the base station apparatus updating the channel information for the radio propagation according to the data communication reference signal received from the terminal and sending a data signal by using the updated channel information.

2. A distributed antenna system according to claim 1,
wherein the base station apparatus sends to the terminal a report signal used to specify a time slot in which the antenna selection reference signal is to be sent;

the terminal sends a reference signal transmission timing reservation signal in the time slot specified by the report signal;

the base station apparatus searches for an open slot for the antenna selection reference signal; and, if a reservation can be made, sends a reference signal transmission timing acknowledge signal that indicates that the reservation can be made and that includes a transmission possible time slot number as a set slot number, to the terminal; and when the terminal receives the reference signal transmission timing acknowledge signal that indicates that the reservation can be made, the terminal sends the antenna selection reference signal with the set slot number with the maximum transmission power or with the antenna selection transmission power threshold or larger.

3. A distributed antenna system according to claim 2,
wherein a plurality of terminals that include the terminal perform simultaneous access at an identical time slot to send reference signal transmission timing reservation signals; and the base station apparatus demodulates and/or decodes the reference signal transmission timing signal sent from each of the plurality of terminals and assigns a set slot number having a different transmission timing to each of the plurality of terminals.

4. A distributed antenna system according to claim 1,
wherein the terminal performs carrier sense processing in which receiving power is measured in a communication bandwidth; if the receiving power is equal to or higher than a threshold, it is determined that another terminal is sending a signal; and, if the receiving power is lower than the threshold, it is determined that another terminal is not sending a signal;

the terminal sends the antenna selection reference signal with the maximum transmission power or with the antenna selection transmission power threshold or larger when it is determined that another terminal is not sending a signal; and the terminal waits for a given backoff time period when it is determined that another terminal is sending a signal; the terminal performs the carrier sense processing when the backoff time period elapses; and the terminal sends the antenna selection reference signal with the maximum transmission power or with the antenna selection transmission power threshold or larger when it is determined that another terminal is not sending a signal.

5. A distributed antenna system according to claim 1,
wherein, when the base station apparatus receives the antenna selection reference signal from the terminal, the base station apparatus extracts one or a plurality of antennas obtaining a receiving power that is equal to or larger than a threshold, as a antenna candidate, and sends a reference signal to the terminal from the one or the plurality of antennas extracted;

when the terminal receives the reference signal, the terminal sends radio propagation channel information obtained from channel estimation, to the base station apparatus as feedback; and the base station apparatus calculates eigenvalues of radio propagation channel acknowledge matrixes corresponding to the combinations of antennas according to the received radio propagation channel information, and selects antennas from the combination of antennas having a large sum of the eigenvalues.

6. A distributed antenna system according to claim 5,
wherein, under the condition that the eigenvalues are equal to or larger than a predetermined threshold, the differences between the eigenvalues are checked to select the combination of antennas having the smallest difference between the eigenvalues.

7. A distributed antenna system according to claim 1,
wherein the base station apparatus sends a report signal specifying information about one or a plurality of open slots in which the antenna selection reference signal may be sent;

when the terminal receives a report signal, the terminal selects the number of a slot to be used among the one or the plurality of open slots and sends a reference signal transmission timing reservation signal in which the selected slot number is specified, to the base station apparatus;

when the base station apparatus receives the reference signal transmission timing reservation signal, the base station apparatus checks whether the slot having the specified slot number can be kept and sends a reference signal transmission timing acknowledge signal that includes data indicating that a reservation can be made if the slot can be kept; and when the terminal receives the reference signal transmission timing acknowledge signal, the terminal sends the antenna selection reference signal with the specified slot number with the maximum transmission power or with the antenna selection transmission power threshold or larger if the reservation can be made.

8. A distributed antenna system according to claim 1,
wherein the terminal periodically sends the antenna selection reference signal at given time intervals; and the base station apparatus performs the antenna selection processing based on the antenna selection reference signal to re-select an antenna for data communication.

9. A communication control method in a distributed antenna system comprising:

a base station apparatus having a plurality of antennas;
a terminal having a plurality of antennas; and
a plurality of distribution apparatuses accommodating one or a plurality of antennas, the plurality of distribution apparatuses being distributed spatially and disposed;

the communication control method including steps of:
the base station apparatus and the terminal adjusting a transmission time slot or a transmission timing for sending an antenna selection reference signal;

the terminal sending the antenna selection reference signal in the adjusted time slot or the adjusted transmission timing with the maximum transmission power or with a predetermined antenna selection transmission power threshold which is larger than data communication power, or larger;

the base station apparatus receiving the antenna selection reference signal with the plurality of antennas of each distribution apparatus and performing antenna selection processing for selecting one or a plurality of antennas to be used, according to the receiving strength or receiving state of the antenna selection reference signal;

the base station apparatus obtaining channel information for radio propagation between the terminal and the one or the plurality of antennas selected, according to the antenna selection reference signal, and generating and sending a data signal for data communication by using the channel information;

the terminal controlling transmission power such that a signal reaches the one or the plurality of antennas selected, with a sufficient receiving power, and reporting a data communication reference signal; and the base station apparatus updating the channel information for the radio propagation according to the data communication reference signal received from the terminal and sending a data signal by using the updated channel information.

10. A base station apparatus in a distributed antenna system comprising:

the base station apparatus having a plurality of antennas;

a terminal having a plurality of antennas; and a plurality of distribution apparatuses accommodating one or a plurality of antennas, the plurality of distribution apparatuses being distributed spatially and disposed;

the base station apparatus, with the terminal, adjusting a transmission time slot or a transmission timing for sending an antenna selection reference signal;

the base station apparatus, from the terminal, receiving the antenna selection reference signal in the adjusted time slot or the adjusted transmission timing with the maximum transmission power or with a predetermined antenna selection transmission power threshold which is larger than data communication power, or larger;

the base station apparatus receiving the antenna selection reference signal with the plurality of antennas of each distribution apparatus and performing antenna selection processing for selecting one or a plurality of antennas to be used, according to the receiving strength or receiving state of the antenna selection reference signal;

the base station apparatus obtaining channel information for radio propagation between the terminal and the one or the plurality of antennas selected, according to the antenna selection reference signal, and generating and sending a data signal for data communication by using the channel information;

the base station apparatus, from the terminal, receiving a data communication reference signal, transmission power of which is controlled such that a signal reaches the one or the plurality of antennas selected, with a sufficient receiving power, and; and the base station apparatus updating the channel information for the radio propagation according to the data communication reference signal received from the terminal and sending a data signal by using the updated channel information.

11. A communication control method according to claim 9, wherein the base station apparatus sends to the terminal a report signal used to specify a time slot in which the antenna selection reference signal is to be sent;

the terminal sends a reference signal transmission timing reservation signal in the time slot specified by the report signal;

the base station apparatus searches for an open slot for the antenna selection reference signal; and, if a reservation can be made, sends a reference signal transmission timing acknowledge signal that indicates that the reservation can be made and that includes a transmission possible time slot number as a set slot number, to the terminal; and when the terminal receives the reference signal transmission timing acknowledge signal that indicates that the reservation can be made, the terminal sends the antenna selection reference signal with the set slot number with the maximum transmission power or with the antenna selection transmission power threshold or larger.

12. A communication control method according to claim 11, wherein a plurality of terminals that include the terminal perform simultaneous access at an identical time slot to send reference signal transmission timing reservation signals; and the base station apparatus demodulates and/or decodes the reference signal transmission timing signal sent from each of the plurality of terminals and assigns a set slot number having a different transmission timing to each of the plurality of terminals.

13. A communication control method according to claim 9, wherein the terminal performs carrier sense processing in which receiving power is measured in a communication bandwidth; if the receiving power is equal to or higher than a threshold, it is determined that another terminal is sending a signal; and, if the receiving power is lower than the threshold, it is determined that another terminal is not sending a signal;

the terminal sends the antenna selection reference signal with the maximum transmission power or with the antenna selection transmission power threshold or larger when it is determined that another terminal is not sending a signal; and the terminal waits for a given backoff time period when it is determined that another terminal is sending a signal; the terminal performs the carrier sense processing when the backoff time period elapses; and the terminal sends the antenna selection reference signal with the maximum transmission power or with the antenna selection transmission power threshold or larger when it is determined that another terminal is not sending a signal.

14. A communication control method according to claim 9, wherein, when the base station apparatus receives the antenna selection reference signal from the terminal, the base station apparatus extracts one or a plurality of antennas obtaining a receiving power that is equal to or larger than a threshold, as a antenna candidate, and sends a reference signal to the terminal from the one or the plurality of antennas extracted;

when the terminal receives the reference signal, the terminal sends radio propagation channel information obtained from channel estimation, to the base station apparatus as feedback; and the base station apparatus calculates eigenvalues of radio propagation channel acknowledge matrixes corresponding to the combinations of antennas according to the received radio propagation channel information, and selects antennas from the combination of antennas having a large sum of the eigenvalues.

15. A communication control method according to claim 14, wherein, under the condition that the eigenvalues are equal to or larger than a predetermined threshold, the differences between the eigenvalues are checked to select the combination of antennas having the smallest difference between the eigenvalues.

16. A communication control method according to claim 9,
- wherein the base station apparatus sends a report signal specifying information about one or a plurality of open slots in which the antenna selection reference signal may be sent;
- when the terminal receives a report signal, the terminal selects the number of a slot to be used among the one or the plurality of open slots and sends a reference signal transmission timing reservation signal in which the selected slot number is specified, to the base station apparatus;
- when the base station apparatus receives the reference signal transmission timing reservation signal, the base station apparatus checks whether the slot having the specified slot number can be kept and sends a reference signal transmission timing acknowledge signal that includes data indicating that a reservation can be made if the slot can be kept; and
- when the terminal receives the reference signal transmission timing acknowledge signal, the terminal sends the antenna selection reference signal with the specified slot number with the maximum transmission power or with the antenna selection transmission power threshold or larger if the reservation can be made.

17. A communication control method according to claim 9,
- wherein the terminal periodically sends the antenna selection reference signal at given time intervals; and
- the base station apparatus performs the antenna selection processing based on the antenna selection reference signal to re-select an antenna for data communication.

* * * * *